(12) United States Patent
Goss

(10) Patent No.: US 10,788,077 B2
(45) Date of Patent: *Sep. 29, 2020

(54) DRIVE SYSTEM WITH FULL SURFACE DRIVE CONTACT

(71) Applicant: Acument Intellectual Properties, LLC, Sterling Heights, MI (US)

(72) Inventor: David C. Goss, Rockford, IL (US)

(73) Assignee: ACUMENT INTELLECTUAL PROPERTIES, LLC, Sterling Heights, MI (US)

( * ) Notice: Subject to any disclaimer, the term of this patent is extended or adjusted under 35 U.S.C. 154(b) by 297 days.

This patent is subject to a terminal disclaimer.

(21) Appl. No.: 15/704,887

(22) Filed: Sep. 14, 2017

(65) Prior Publication Data

US 2018/0003241 A1 Jan. 4, 2018

Related U.S. Application Data

(63) Continuation-in-part of application No. 15/072,028, filed on Mar. 16, 2016.

(Continued)

(51) Int. Cl.
*F16B 23/00* (2006.01)
*F16D 1/10* (2006.01)
(Continued)

(52) U.S. Cl.
CPC ............. *F16D 1/101* (2013.01); *B21J 13/00* (2013.01); *B21K 1/463* (2013.01); *B25B 15/004* (2013.01);
(Continued)

(58) Field of Classification Search
CPC . F16B 23/0061; F16B 23/003; F16B 23/0092
(Continued)

(56) References Cited

U.S. PATENT DOCUMENTS 2,248,695 A * 7/1941 Bradshaw ........... F16B 23/0007
411/410
3,400,626 A * 9/1968 Bergere ................ B25B 15/005
411/405
(Continued)

FOREIGN PATENT DOCUMENTS

CN 1103002 C 3/2003
CN 102112758 A 6/2011
(Continued)

OTHER PUBLICATIONS

Tong, Shih-Hsi, and Daniel C.H. Yang; "Involute-Based Screw Driver Profiles With High Load Capacity"; Journal of Mechanical Design, vol. 134, Feb. 17, 2012.

*Primary Examiner* — Flemming Saether
(74) *Attorney, Agent, or Firm* — Clark Hill PLC; James R. Foley

(57) ABSTRACT

A drive system with full surface drive contact. The drive system tends to maximize the surface contact pattern or area at typical bit-recess reaction (drive) torque values, thereby tending to minimize bit-recess surface contact stresses, coating damage, recess ream and premature bit fatigue failure. The drive system comprises a fastener and/or bit having drive surfaces formed of either polygon involutes or a single arc construction. A punch is also provided for forming a recess in either the fastener or the bit, wherein the punch has corresponding surfaces.

12 Claims, 31 Drawing Sheets

Related U.S. Application Data

(60) Provisional application No. 62/395,096, filed on Sep. 15, 2016, provisional application No. 62/135,390, filed on Mar. 19, 2015.

(51) Int. Cl.
    *B25B 15/00*     (2006.01)
    *B21K 1/46*     (2006.01)
    *B21J 13/00*     (2006.01)

(52) U.S. Cl.
    CPC .......... *B25B 15/005* (2013.01); *F16B 23/003* (2013.01); *F16D 1/10* (2013.01); *F16D 2001/102* (2013.01)

(58) Field of Classification Search
    USPC .................................................. 411/402, 410
    See application file for complete search history.

(56) References Cited

U.S. PATENT DOCUMENTS

| | | | |
|---|---|---|---|
| 3,874,258 A * | 4/1975 | Semola | B25B 13/485 |
| | | | 81/121.1 |
| 4,006,660 A * | 2/1977 | Yamamoto | F16B 23/003 |
| | | | 411/405 |
| 4,073,160 A | 2/1978 | Perret | |
| 5,137,407 A | 8/1992 | Yamamoto | |
| 5,378,101 A * | 1/1995 | Olson | B25B 13/485 |
| | | | 411/404 |
| 5,577,871 A | 11/1996 | Brugola | |
| 5,957,645 A | 9/1999 | Stacy | |
| 6,079,299 A | 6/2000 | Sundstrom | |
| 6,186,718 B1 | 2/2001 | Fogard | |
| 6,257,851 B1 | 7/2001 | Bush et al. | |
| 6,367,358 B1 | 4/2002 | Stacy | |
| 7,255,522 B2 | 8/2007 | Dilling | |
| 7,891,274 B2 | 2/2011 | Dilling | |
| 8,123,524 B2 | 2/2012 | Anitua | |
| 8,740,533 B2 | 6/2014 | Gaillard | |
| 9,004,836 B2 * | 4/2015 | Wells | F16B 23/0007 |
| | | | 411/402 |
| 9,964,133 B2 * | 5/2018 | Bjelobradic | F16B 23/0038 |
| 2002/0039523 A1 | 4/2002 | Hartmann et al. | |
| 2003/0059233 A1 | 3/2003 | Jang et al. | |
| 2004/0149088 A1 | 8/2004 | Yamamoto | |
| 2005/0136380 A1 | 6/2005 | Niznick | |
| 2007/0037123 A1 | 2/2007 | Mansueto et al. | |
| 2009/0175702 A1 * | 7/2009 | Lin | B25B 13/065 |
| | | | 411/386 |
| 2010/0129176 A1 | 5/2010 | Karupaya | |
| 2011/0116895 A1 | 5/2011 | Garver | |
| 2011/0203423 A1 | 8/2011 | Dilling | |
| 2012/0099944 A1 | 4/2012 | Kageyama et al. | |
| 2012/0137842 A1 | 6/2012 | Guo | |
| 2012/0255189 A1 | 10/2012 | Gaillard | |
| 2013/0068075 A1 | 3/2013 | Stiebitz et al. | |
| 2016/0223005 A1 | 8/2016 | Rathmann et al. | |
| 2016/0305462 A1 | 10/2016 | Wunderlich | |
| 2018/0156257 A1 * | 6/2018 | Ruhl | F16B 23/0007 |

FOREIGN PATENT DOCUMENTS

| | | |
|---|---|---|
| CN | 107427993 A | 12/2017 |
| DE | 10200406769 A1 | 12/2004 |
| EP | 1025370 | 8/2000 |
| EP | 1731774 A1 | 12/2006 |
| GB | 893536 A | 4/1962 |
| JP | H03163207 A | 7/1991 |
| RU | 2315209 C2 | 1/2008 |
| RU | 2484231 C1 | 6/2013 |
| WO | 2016149526 | 9/2016 |

\* cited by examiner

FIG. 19
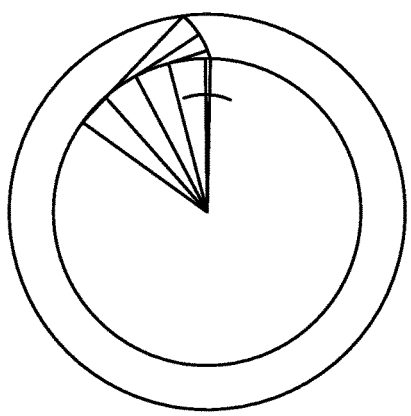
FIG. 20          FIG. 21
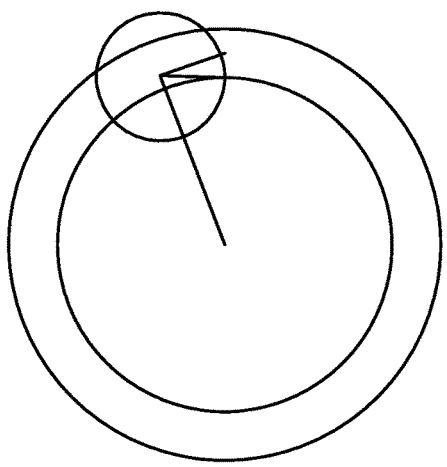 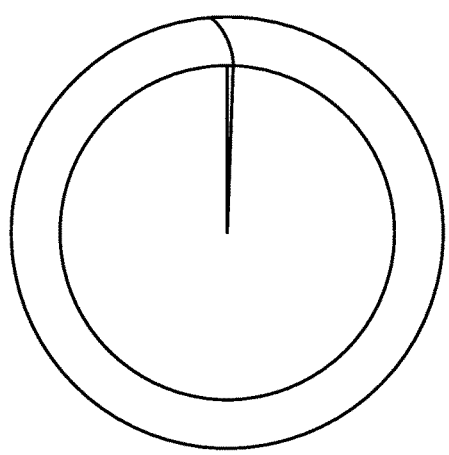

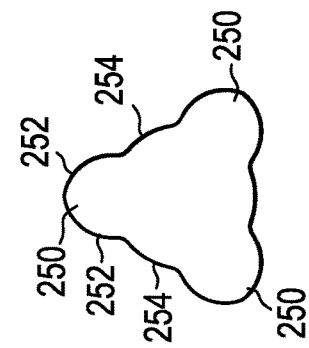
FIG. 43
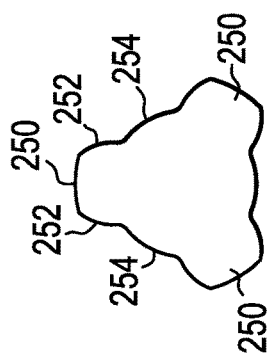
FIG. 44
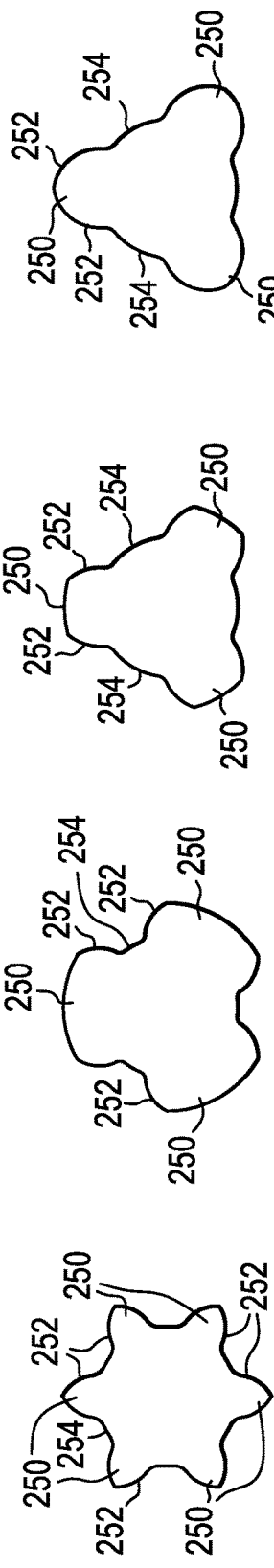
FIG. 45
FIG. 46
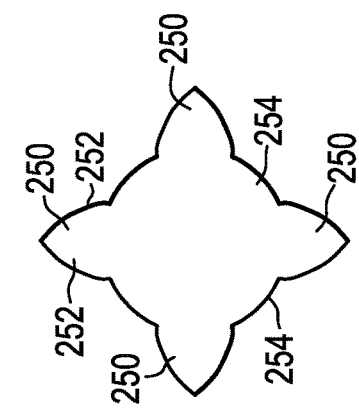
FIG. 47
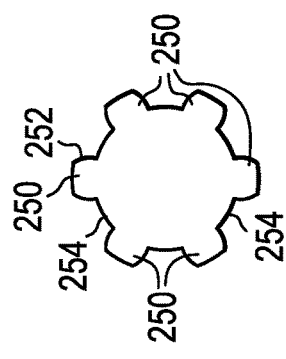
FIG. 48
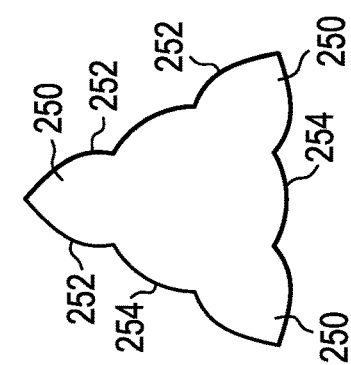
FIG. 49
FIG. 50

DRIVE SYSTEM WITH FULL SURFACE DRIVE CONTACT

RELATED APPLICATION (PRIORITY CLAIM)

This application is a continuation-in-part of U.S. patent application Ser. No. 15/072,028, filed Mar. 16, 2016, which claims the benefit of U.S. Provisional Application Ser. No. 62/135,390, filed Mar. 19, 2015, both of which are hereby incorporated herein by reference in their entirety. The present application also claims the benefit of U.S. Provisional Application Ser. No. 62/395,096, filed Sep. 15, 2016, which is also hereby incorporated herein by reference in its entirety.

BACKGROUND

The present invention generally relates to drive systems, such as drive systems involving a bit and a fastener, as well as a punch for forming a recess in the fastener.

Typical fastener drive system designs or geometries result in various surface contact patterns between the drive tool (i.e., bit) and fastener drive feature (i.e., recess). For example, some drive system geometries result in a "point" contact surface pattern, meaning that when the bit is rotated to initial contact with the recess (with near zero reaction torque), it contacts the recess at a point (or a plurality of points around the recess).

Other drive system geometries result in a "line" contact surface pattern, meaning that when the bit is rotated to initial contact, it contacts the recess at a plurality of lines. To place the bit inside of the recess in the fastener, there has to be some sort of gap between the bit and recess. As the bit is rotated, the gap between the bit and recess narrows until there is line contact with the sidewalls of the recess. Both point and line contact systems generate high stresses throughout the drive system and can also add to bit failure.

Still other drive system geometries result in an "area" contact surface pattern from the end of the bit to the top of the recess. Generally, an "area" contact surface pattern is more beneficial than a "line" contact surface pattern, and a "line" contact surface pattern is more beneficial than a "point" contact surface pattern.

However, even with regard to an "area" contact surface pattern, as bit-recess reaction torque (i.e., drive torque) increases, the drive bit geometry is elastically distorted (i.e., twisted and compressed), as well as the recess geometry (i.e., compressed), causing the bit-recess contact surface pattern to change and shift from the end of the bit toward the top of the recess. As the reaction torque increases, the surface contact pattern area tends to decrease, thus further increasing bit-recess contact stresses. The increased contact stresses at the top of the recess may damage the fastener finish (i.e., coating), and may lead to recess failure (ream-out). The increased contact stresses on the bit (and twisting) may cause premature wear, recess failure and fatigue failure.

SUMMARY

An object of an embodiment of the present invention is to provide a drive system with full surface drive contact.

An object of an embodiment of the present invention is to provide a drive system that tends to maximize the surface contact pattern or area at typical bit-recess reaction (drive) torque values, thereby tending to minimize bit-recess surface contact stresses, coating damage, recess ream and premature bit fatigue failure.

Briefly, an embodiment of the present invention provides a drive system which includes a fastener, wherein the fastener comprises drive surfaces which are formed of polygon involutes formed of one or more arcs, or is a single arc construction. With regard to the arcs that define the drive surfaces, preferably each arc has a constant radius (i.e., is a segment of a circle).

Another embodiment of the present invention provides a bit that comprises drive surfaces which are formed of polygon involutes formed of one or more arcs, or is a single arc construction. With regard to the arcs that define the drive surfaces, preferably each arc has a constant radius (i.e., is a segment of a circle).

Another embodiment of the present invention provides a punch that comprises surfaces which are formed of polygon involutes formed of one or more arcs, or is a single arc construction. With regard to the arcs that define the surfaces, preferably each arc has a constant radius (i.e., is a segment of a circle).

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIGS. 14-21 provide views relating to alternative embodiments;

FIGS. 28-53 illustrate alternative embodiments of the present invention.

DESCRIPTION OF ILLUSTRATED EMBODIMENTS

Figure 1:
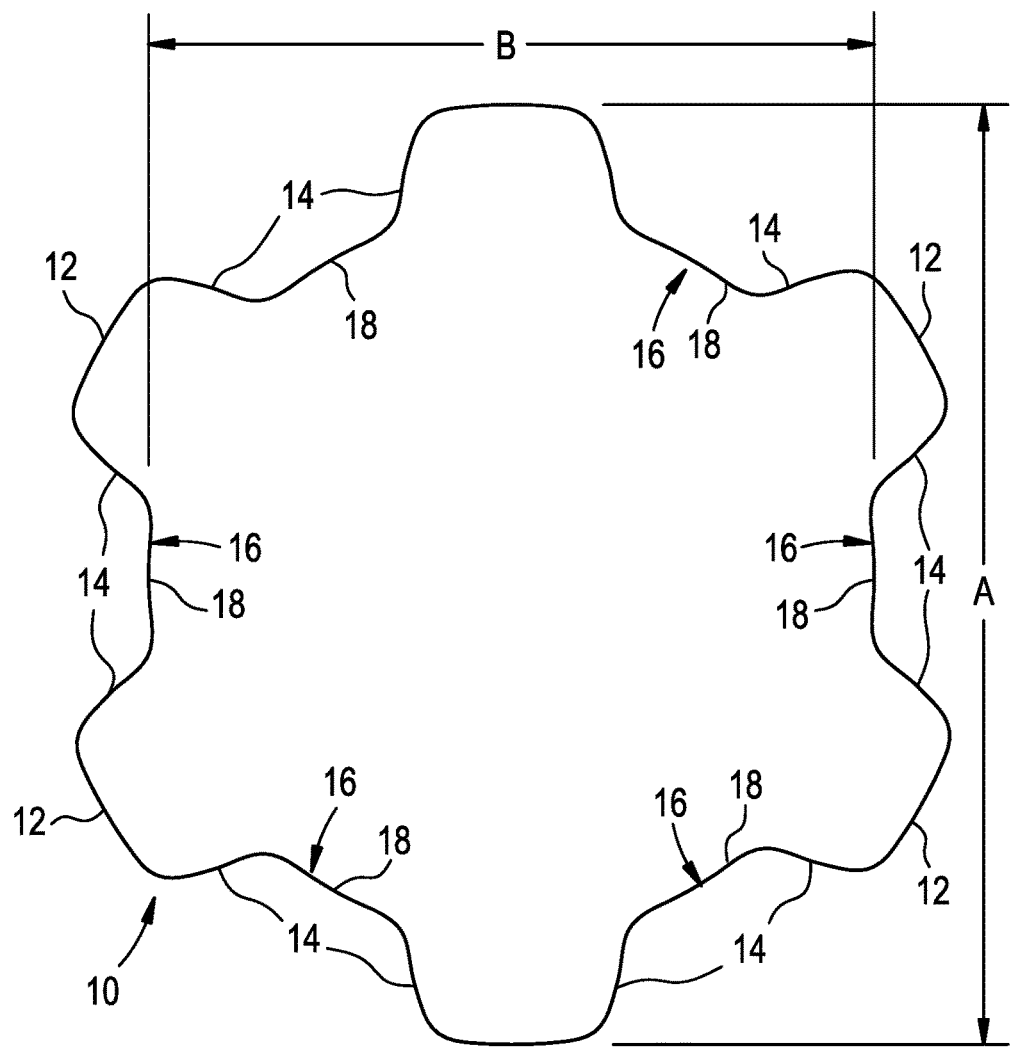
FIG. 1 illustrates a recess (or punch) which in accordance with an embodiment of the present invention.

While this invention may be susceptible to embodiment in different forms, there are shown in the drawings and will be described herein in detail, specific embodiments with the understanding that the present disclosure is to be considered an exemplification of the principles of the invention, and is not intended to limit the invention to that as illustrated.

A plurality of embodiments of the present invention is disclosed herein. Each embodiment provides a drive system with full surface drive contact. Specifically, each embodiment includes a fastener, wherein the fastener includes a recess which comprises drive surfaces which are formed of either polygon involutes or is provided as being a single arc construction.

With regard to the term "involute," an involute is the locus of a point, initially on a base circle, which moves so that its straight line distance, along a tangent to the circle, to the tangential point of contact, is equal to the distance along the arc of the circle from the initial point to the instant point of tangency. Alternatively, an involute is the locus of a point on a straight line when the straight line rolls round the circumference of a circle without slipping. The involute is best visualized as the path traced out by the end of, for example, string or a piece of cotton, when the string or cotton is unrolled from its cylindrical reel.

To produce an involute profile, a line is traceable by unwinding, for example, a string from a cylinder. The cylinder can be referred to as the base circle. At any point during this unwinding, the generation line (i.e., the string) is at a tangent with the cylinder and is normal to the involute curve. If two involute profiles were in contact with each other, the generating line would be tangent to both cylinders, which is often called the pressure line.

Mathematically, an involute curve is taken from the following equation:

$$\theta = \beta - \tan^{-1}\sqrt{\frac{R^2 - R_b^2}{R_b}}$$

Wherein R=the radius to any point on the involute; θ=the angle from the start of the involute to radius R; and β=the angle through which the string has to be unwound.

With the generating line length equal to $\sqrt{R^2 - R_b^2}$ and also the length of the circumference of the base circle subtended by the angle β such that $$\sqrt{R^2 - R_b^2} = R_b \beta$$

or $$\beta = \sqrt{\frac{R^2 - R_b^2}{R_b}}$$

And through substitution $$\theta = \sqrt{\frac{R^2 - R_b^2}{R_b}} - \tan^{-1}\sqrt{\frac{R^2 - R_b^2}{R_b}}$$

This allows the plotting of the involute curve in polar coordinates (R, θ).

It is common to write the angle as a function of the pressure angle (φ) in the form θ=tan φ−φ=Invφ

Where Inv φ is the Involute function, whose value is tabulated in many books for different gears. This can then be used in many calculations such as the determination of tooth thickness ($T_1$) at different radii, using the equations below.

$$\cos\varphi_2 = \frac{r_1 \cos\varphi_1}{r_2}$$

-continued $$T_2 = 2r_2\left[\frac{T_1}{2r_1} + Inv\varphi_1 - Inv\varphi_2\right]$$

It should be pointed out that a fastener, bit, punch, etc. comprising the present invention may have drive surfaces which are not perfect polygon involutes under a microscope, given real life manufacturing processes and materials.

FIG. 1 illustrates a recess 10, such as a recess in a fastener 11 or other structure (FIG. 1 may also illustrate the end surface profile of a punch 10), where the recess 10 is in accordance with a preferred embodiment of the present invention. Specifically, the recess 10 is configured to provide a plurality of lobes 12, each having drive surfaces 14 which are formed of polygon involutes. In the preferred embodiment, each drive surface is formed of a polygon involute comprised of two arcs, wherein each arc has a different radius, but each arc has a constant radius (i.e., each arc is a segment of a circle). Between each lobe 12 is a flute 16 which provides a wall 18 which extends between adjoining lobes 12. These walls 18, and the different shapes they may take, will be described in more detail later hereinbelow.

Figure 2:
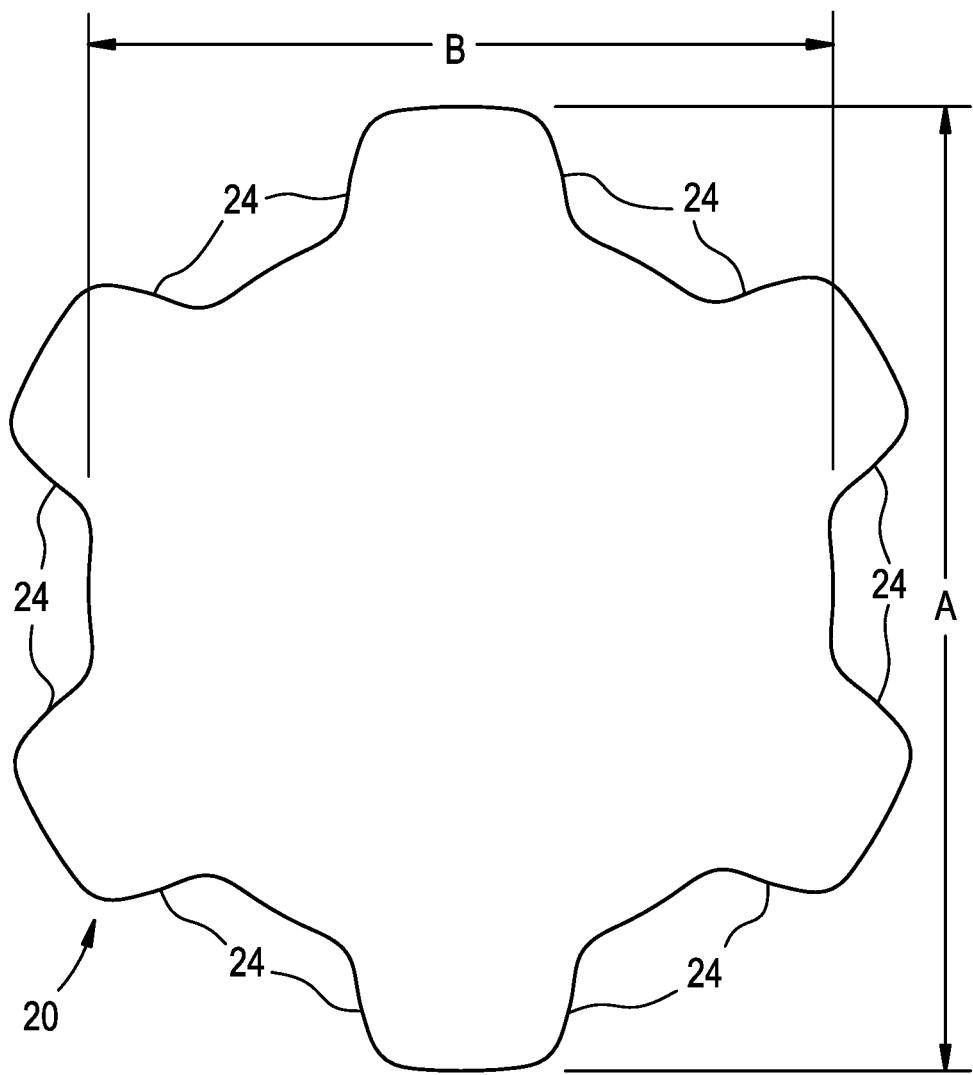
FIG. 2 is a cross-sectional view of a bit which corresponds to the recess shown in FIG. 1.

FIG. 2 provides a cross-sectional view of a corresponding external drive such as a bit 20, where the bit 20 is provided in association with the recess 10 shown in FIG. 1, and where the bit 20 is in accordance with a preferred embodiment of the present invention. Specifically, the profile of the external surface of the bit 20 corresponds to the profile of the recess 10 shown in FIG. 1, such that the bit 20 is insertable in the recess 10, and is rotatable in either a clockwise or counter clockwise direction in order to drive the fastener in which the recess 10 is formed.

The bit 20 corresponds to the recess 10. As such, the bit 20 comprises a plurality of lobes 21, each lobe 21 comprising drive surfaces or drive walls 24 which are formed of polygon involutes. More specifically, preferably the drive surfaces 24 are formed of polygon involutes comprised of two arcs, and each arc has a constant radius (i.e., is a segment of a circle). Preferably, each of the walls 23 between the flutes 21 is at least one of flat, concave circular. convex vertex and concave vertex, as will be described more fully hereinbelow.

Figure 3:
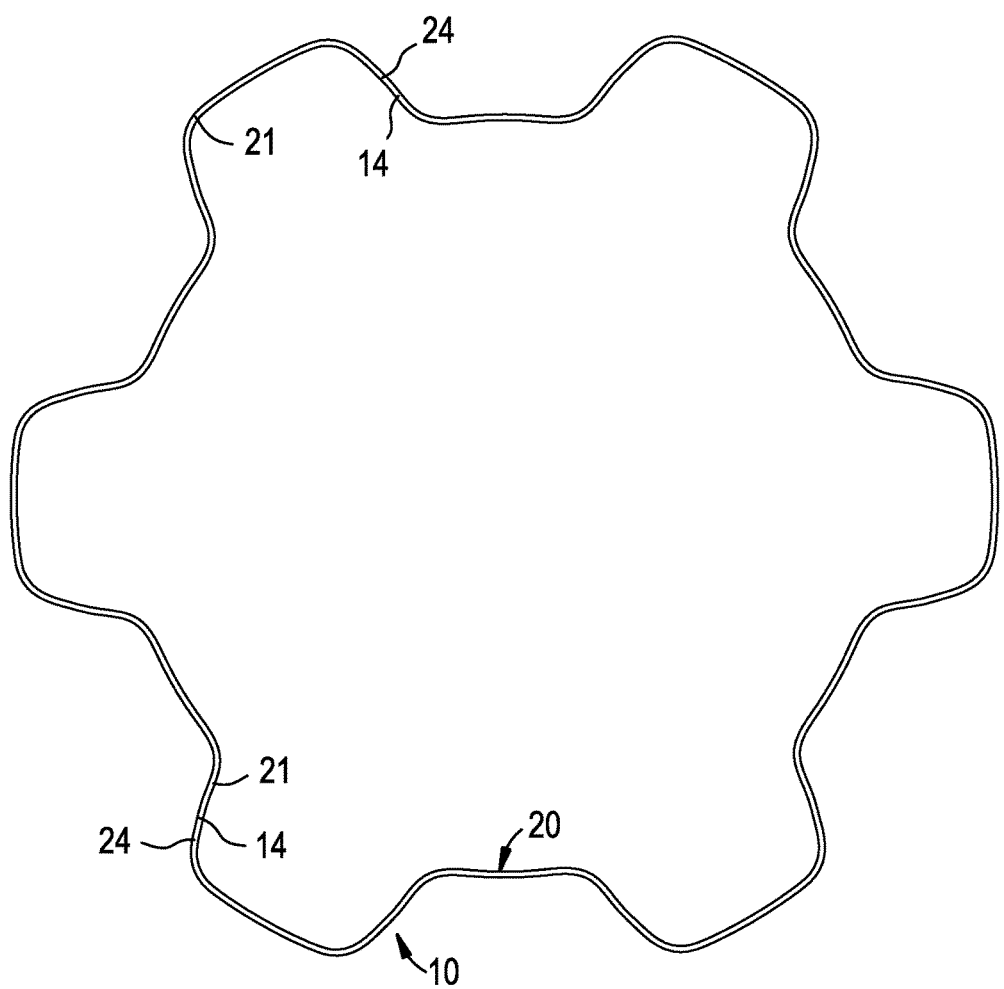
FIG. 3 shows the bit of FIG. 2 inserted in the recess of FIG. 1.
Figure 4:
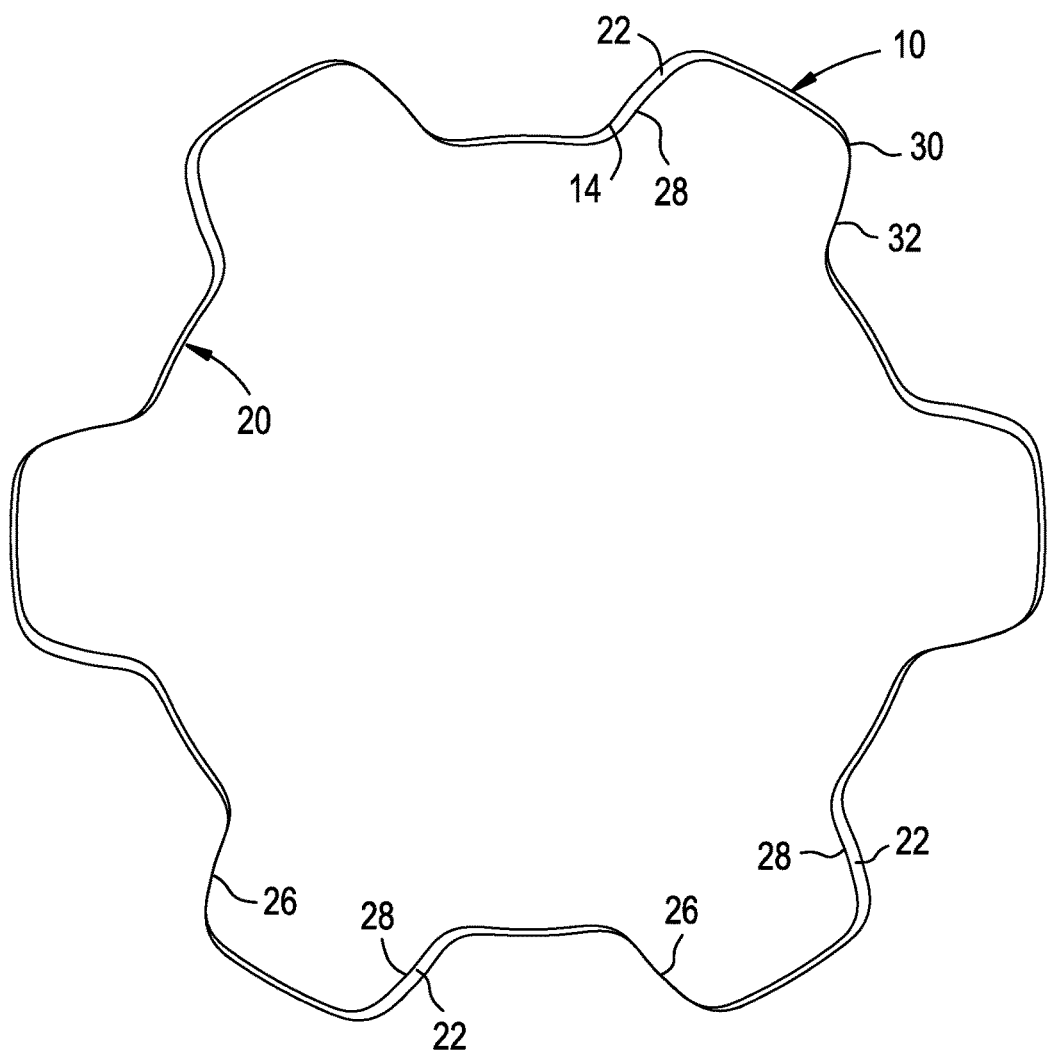
FIG. 4 is similar to FIG. 3, but shows the bit and recess after the bit has been rotated into full surface contact with driving walls of the recess

When the bit 20 is initially inserted in the recess 10, the bit 20 and recess 10 may appear as shown in FIG. 3, wherein there are gaps 21 between drive walls 24 of the bit 20 and the drive walls 14 of the recess 10. Assuming the bit 20 is then rotated clockwise, the bit 20 and recess 10 may appear as shown in FIG. 4, wherein leading walls 26 of the bit 20 engage corresponding drive walls 14 of the recess 10, while trailing walls 28 of the bit 20 are spaced away from corresponding drive walls 14 of the recess 10 to provide gaps 22.

Figure 5:
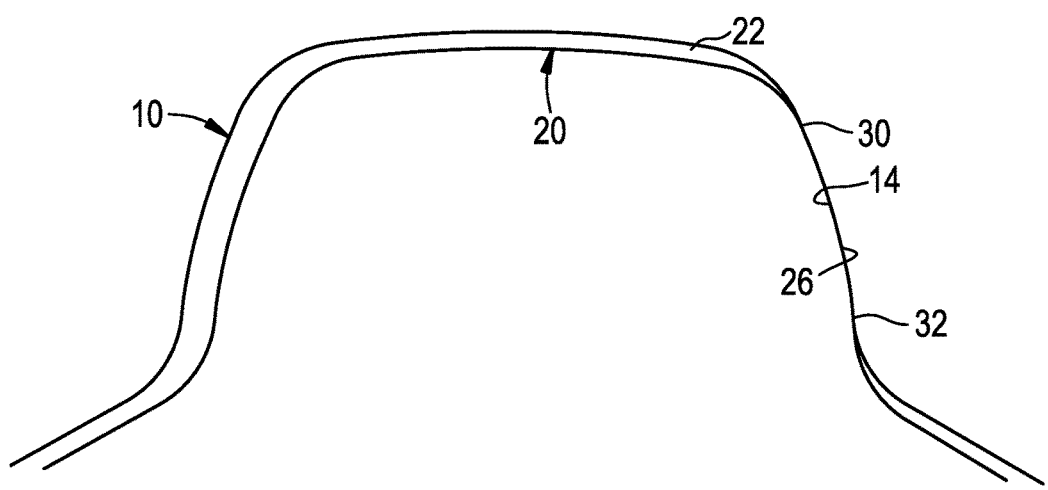
FIG. 5 is an enlarged view which clearly shows the full surface contact.
Figure 6:
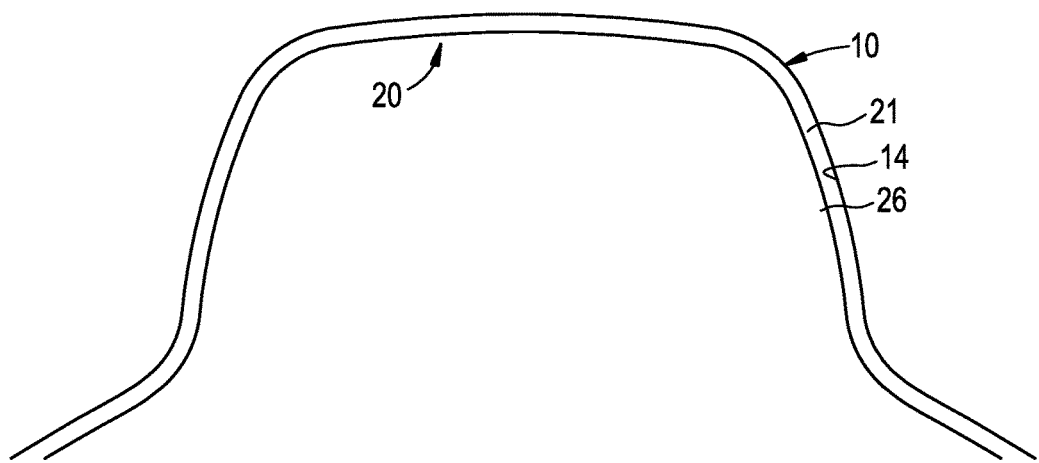
FIG. 6 is an enlarged view which shows a gap between the bit and the recess before the bit is rotated.

The full surface contact between the leading walls 26 of the bit 20 and the corresponding drive walls 14 of the recess 10 can best be seen in FIG. 5, which provides an enlarged view of the interface between one of the leading walls 26 of the bit 20 and one of the drive walls 14 of the recess 10. The full surface contact extends from point 30 to point 32. On the other hand, the gap 21 between the leading walls 26 of the bit 20 and the corresponding drive walls 14 of the recess 10 before the bit 20 is rotated can best be seen in FIG. 6, which provides an enlarged view of one of the leading walls 26 of the bit 20 and the corresponding drive wall 14 of the recess 10. As shown in FIG. 4, but for the surface contact between points 30 and 32, the gap 22 between the bit 20 and the recess 10 is constant, and preferably remains constant while the bit 20 rotates.

While other configurations are disclosed herein, the two arc polygon involute configuration shown in FIGS. 1 and 2 is preferred. With this configuration, the blend radius (i.e., the section between each of the arcs) does not get washed away. Additionally, a minimal gap 22 is provided between the bit and recess. While each arc preferably has a different radius, each arc preferably has a constant radius (i.e., each arc is a segment of a circle). The A and B dimensions shown in FIG. 1 are diameters. Having these diameters aids in the measurement of this feature, provides more lobular width in the A dimension, reduces the chance of chipping of the heading tool, and increases the bit area at the lobes.

Figure 7:
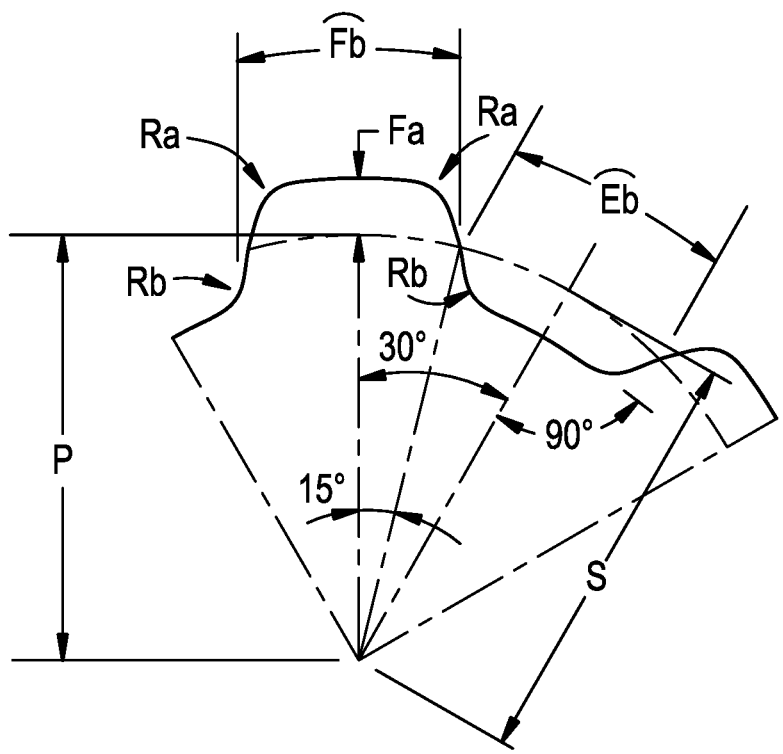
FIGS. 7 and 8 show portions of the recess shown in FIG. 1, but also indicate some dimensions thereof.
Figure 8:
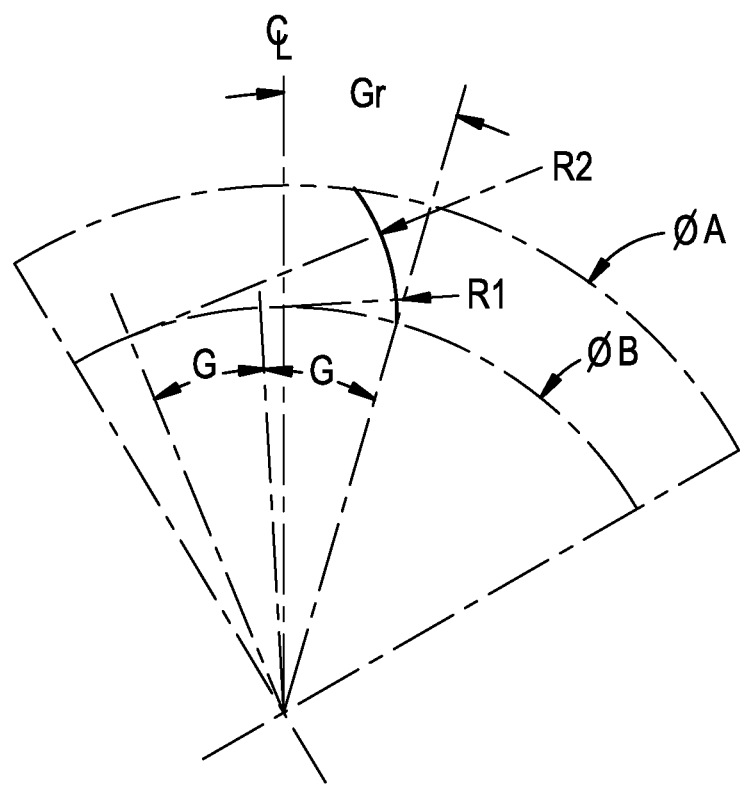

FIG. 7 shows a portion of the recess shown in FIG. 1, and indicates some of the dimensions. FIG. 8 shows just one of the driving walls of the recess, and indicates some other dimensions, including the radius (R1 and R2) of each of the two arcs. As shown, while R1 does not equal R2, each one of R1 and R2 is constant. With regard to the actual values of each of the dimensions, one specific embodiment may provide that, for example (all values being in inches), R1=0.0198752778, R2=0.0397505556, A=0.155, B=0.1206, Fa=0.0086, Fb=0.0360759556, Ea=0.0086, Eb=0.0360759556, P=0.0689, S=0.0689, Ra=0.007 and Rb=0.005. With regard to Gr and G, Gr may be 17.9021442092 degrees and G (REF) may be 18.9716157232 degrees. This is just one embodiment of the present invention, and plenty other sizes, shapes, etc. are entirely possible while still staying within the scope of the present invention.

Figure 9:
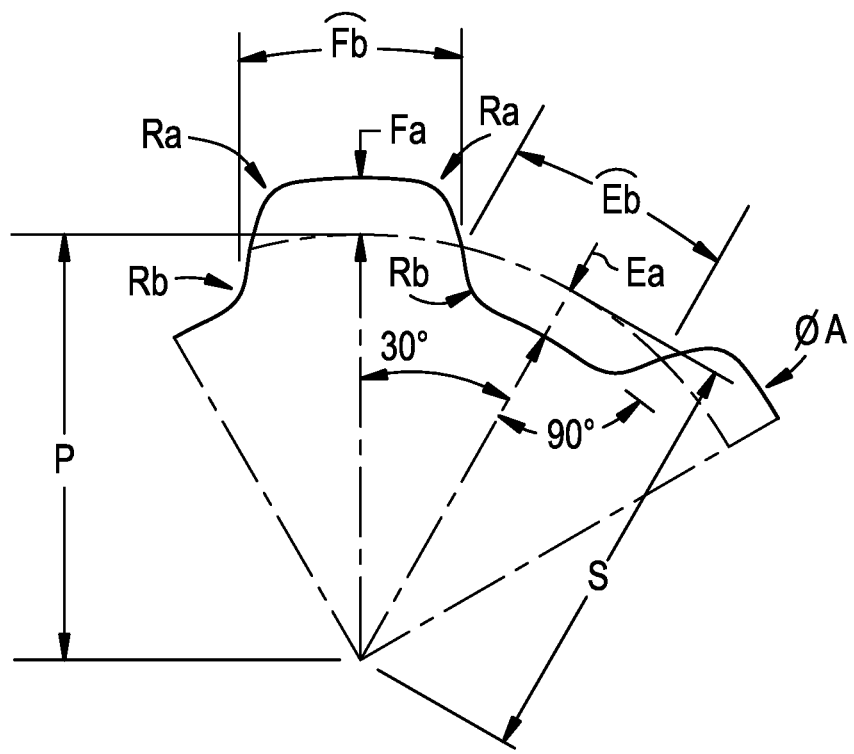
FIGS. 9 and 10 show portions of the bit shown in FIG. 2, but also indicate some dimensions thereof.
Figure 10:
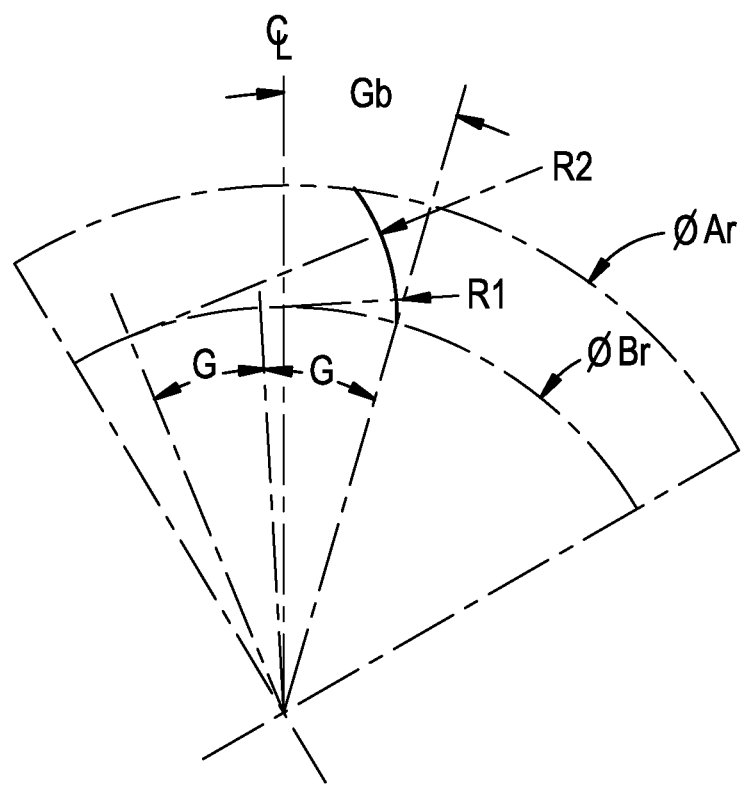
Figure 11:
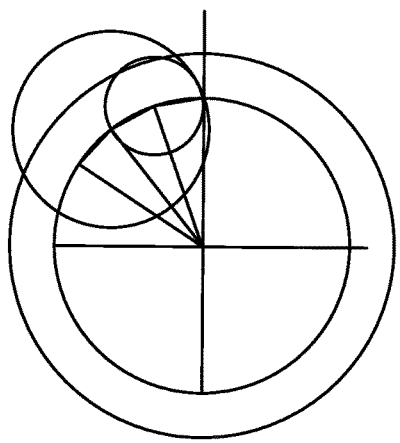
FIGS. 11-13 provide views relating to the recess shown in FIG. 1.
Figure 12:
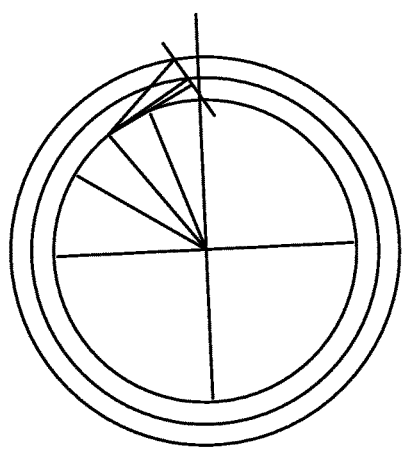
Figure 13:
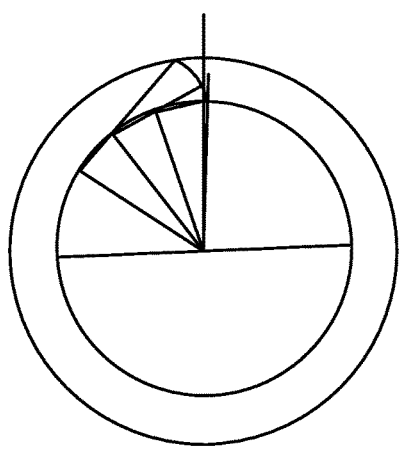

FIGS. 9 and 10 are similar to FIGS. 7 and 8, but relate to the bit 20 shown in FIG. 2. As shown, the bit has a shape which corresponds to the recess. FIGS. 11-13 provide a plurality of views relating to the two arc configuration and are self-explanatory.

Figure 14:
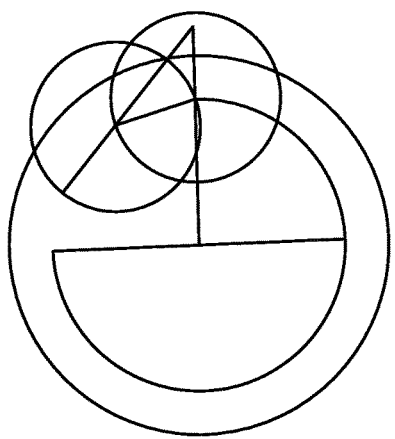
Figure 15:
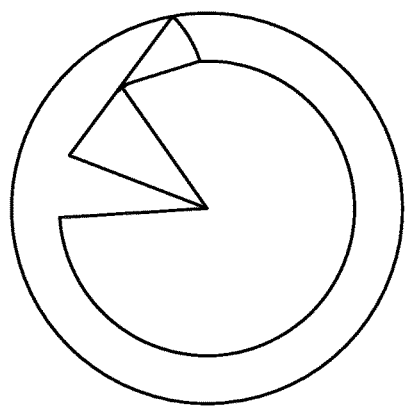
Figure 16:
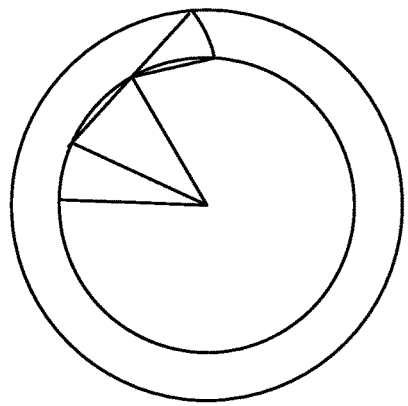

FIGS. 14-16 provide a plurality of views relating to an alternative embodiment and are also self-explanatory. Specifically, FIG. 14-16 show a configuration where each of the drive walls of the recess is provided as being formed of a polygon involute comprising one arc, said arc having a constant radius (i.e., it is a segment of a circle).

Figure 17:
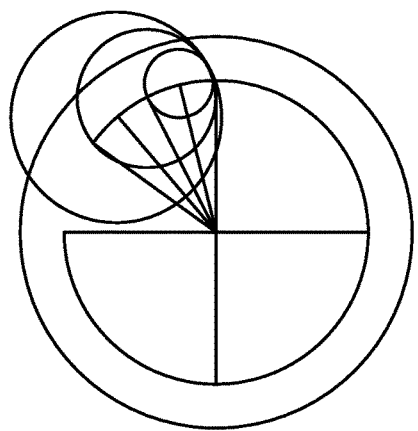
Figure 18:
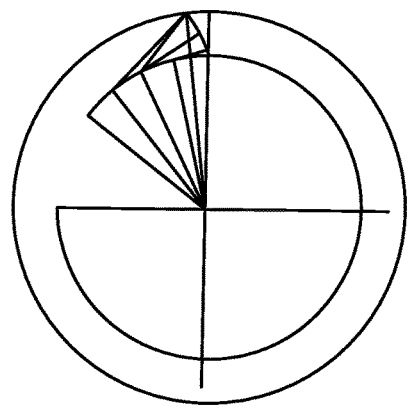

FIGS. 17-19 provide a plurality of views relating to yet another embodiment and are self-explanatory. Specifically, FIG. 17-19 show a configuration where each of the drive walls of the recess is provided as being formed of a polygon involute comprising three arcs, wherein each arc has a different radius, but each arc has a constant radius (i.e., each arc is a segment of a circle).

FIGS. 20-21 provide a plurality of views relating to a still further embodiment and are self-explanatory. Specifically, FIG. 20-21 show a configuration where each of the drive walls of the recess are provided as being of a single arc construction, wherein the radius of the arc is constant (i.e., the arc is a segment of a circle).

Figure 22:
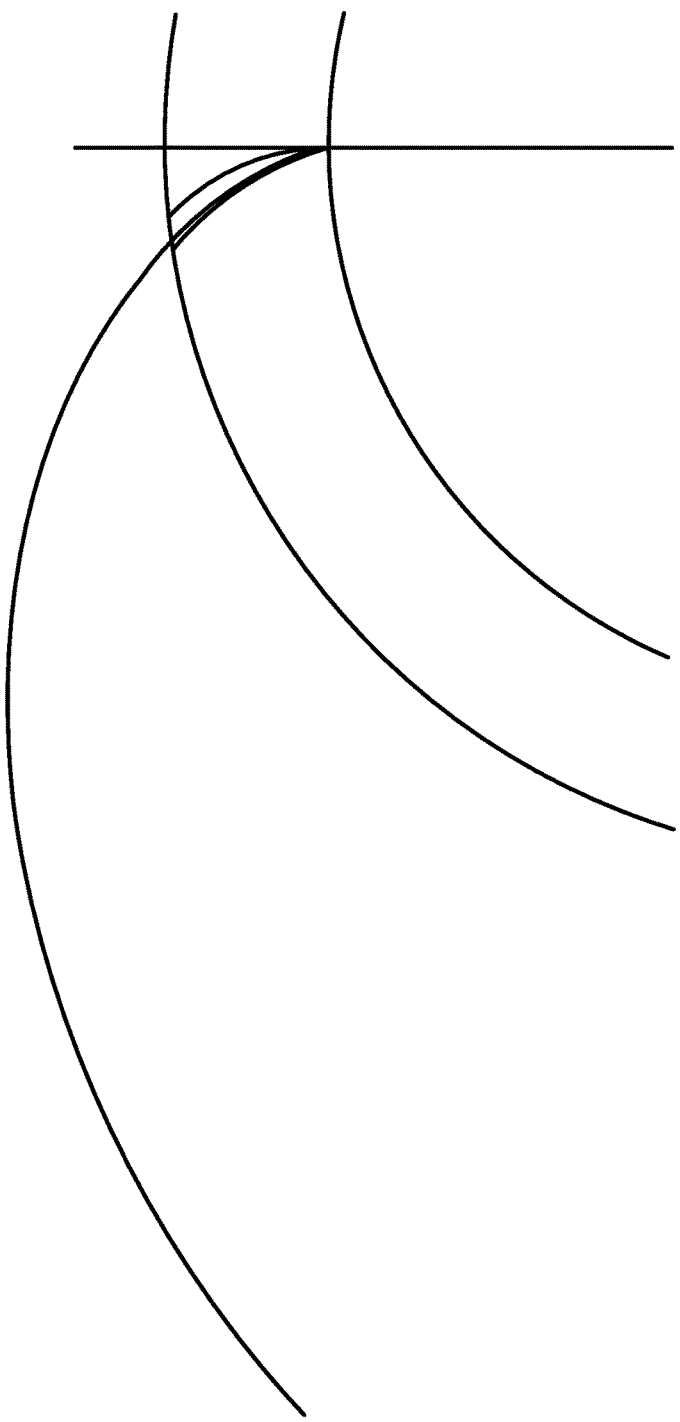
FIG. 22 is a view which compares the embodiments.

FIG. 22 is a view which compares the different embodiments. Reference numeral 200 identifies circle involute-high precision, reference numeral 202 identifies a polygon involute-1 arc, reference numeral 204 identifies a polygon involute-2 arcs, reference numeral 206 identifies a polygon involute-3 arcs, and reference numeral 208 identifies a one arc construction (perpendicular arc).

Figure 23:
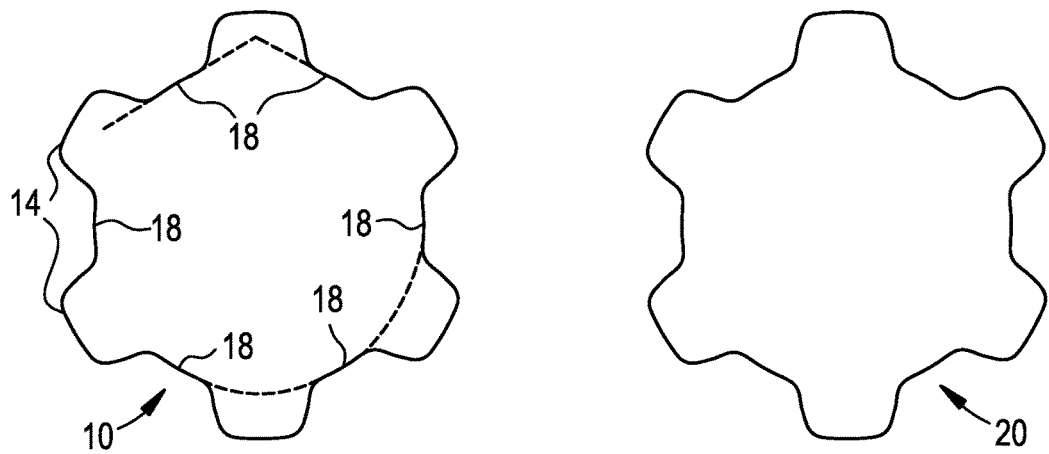
FIGS. 23-27 illustrate different versions of extending walls provided between lobes of the recess.
Figure 24:
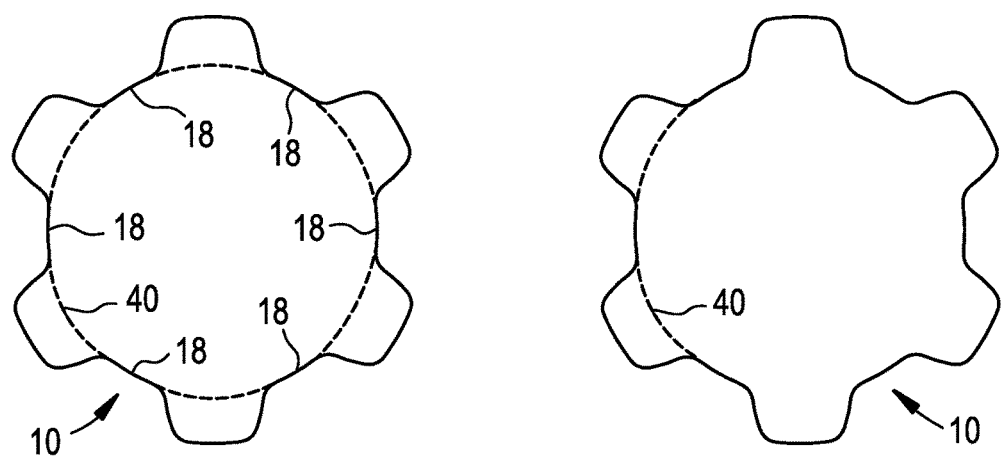

FIGS. 1 and 2 illustrate a configuration wherein walls 18 between the lobes 12 are provided as being flat. This is shown very well in FIG. 23, which shows the recess 10 on the left, the bit 20 on the right. This is a preferred configuration with regard to walls 18 because it provides that the walls 18, collectively define a hexagon shape, thus a hex tool can be inserted in the recess and used to drive the fastener (in addition to the corresponding bit shown on the right in FIG. 23).

Each of FIGS. 24-27 shows an alternative embodiment, and in each case the recess is shown on the left, and the corresponding bit (similarly shaped) is shown on the right. In the embodiment shown in FIG. 24, each of the walls 18 between the flutes is semi-circular (i.e., convex circular) and identifies the circle with reference numeral 40.

Figure 25:
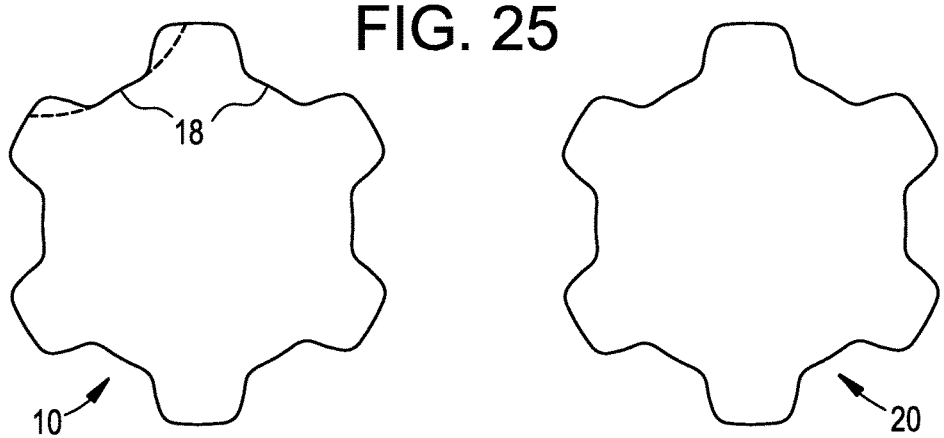
Figure 26:
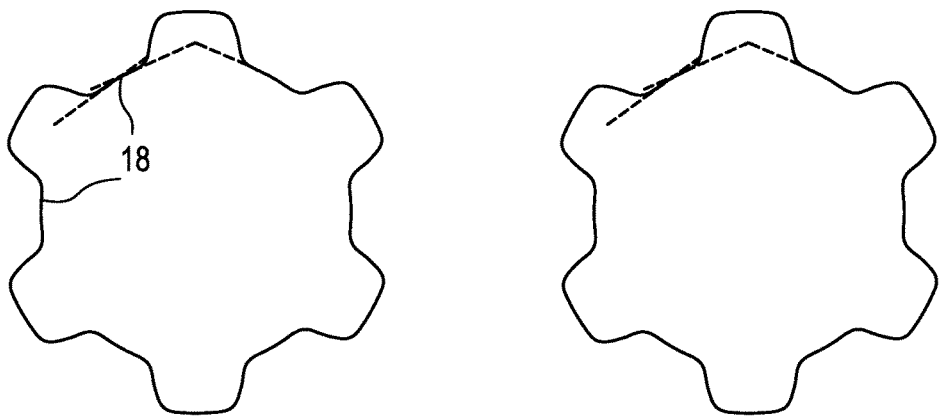
Figure 27:
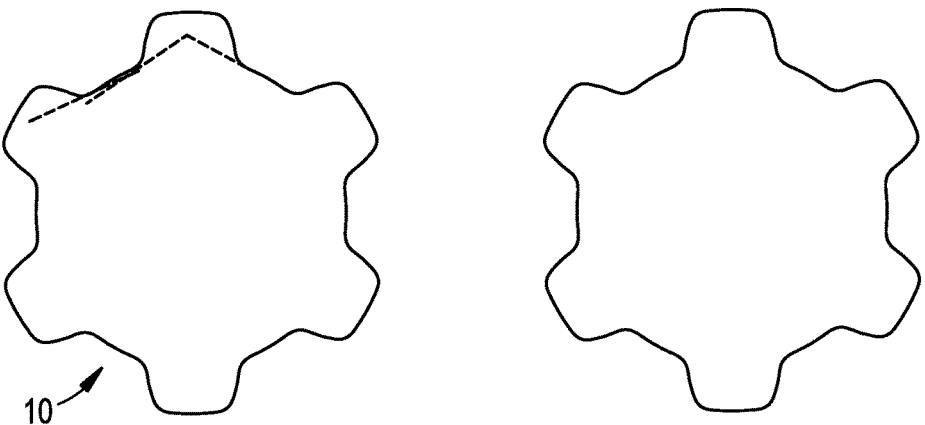
Figure 28:
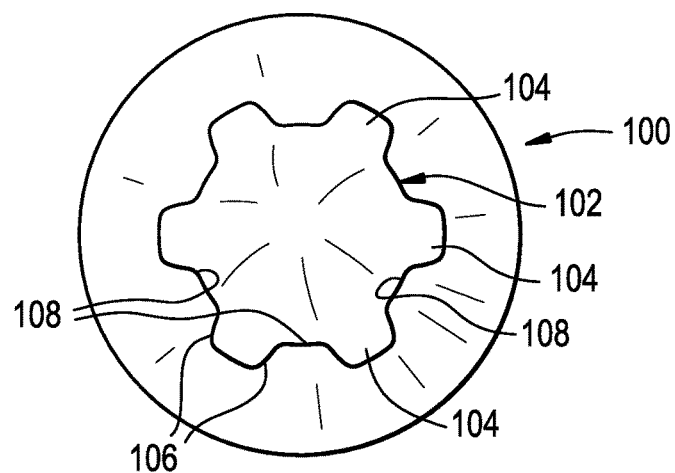

In the embodiment shown in FIG. 25, each of the walls 18 between the lobes 14 is concave circular. In the embodiment shown in FIG. 26, each of the walls 18 between the lobes 14 is a convex vertex. In the embodiment shown in FIG. 27, each of the walls 18 between the lobes 14 is a concave vertex.

Although the depths of none of the recesses disclosed herein has been specifically shown or described, the depth of any of the recesses can take any appropriate form, depending on the application, and the desired properties of the drive system. For example, the depth can be flat (for example, the depth at the bottom of the recess can be flat), conical, have a spherical bottom, etc. For example, the depth may be such that each of the driving walls is semi-cylindrical with regard to going down into the recess.

With regard to the bit provided to engage any of the recesses disclosed herein, preferably the bit is provided as being slightly helical (i.e., pre-twisted). This way the use of an area contact pattern recess geometry is combined with a corresponding slightly helical bit geometry. Consequently, at near zero reaction torque, the end of the bit first contacts the recess and, as the torque increases, the bit-recess surface contact pattern area expands and extends from the end of the bit to the top of the recess.

While embodiments of the present invention have been described as being implemented in the form of a recess in the head of a fastener, embodiments may take the form of the external drives (such as bits) having external profiles which are consistent with the recesses which have been described. In fact, the drawings provided herein would even apply to such embodiments as well. Additionally, while the drawings show a six lobe system, the present invention can be implemented with regard to systems involving either more or fewer lobes, such as three, four or five lobe systems.

Figure 29:
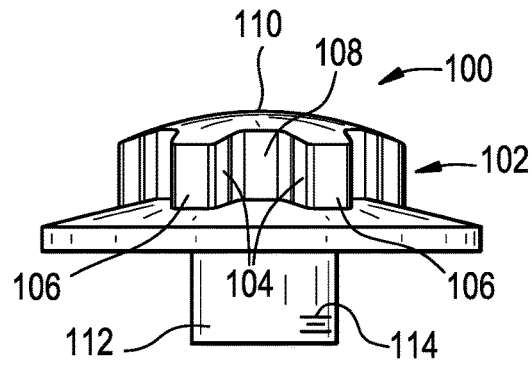
Figure 30:
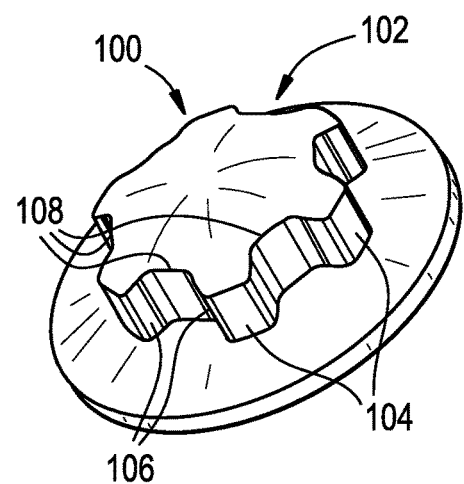
Figure 31:
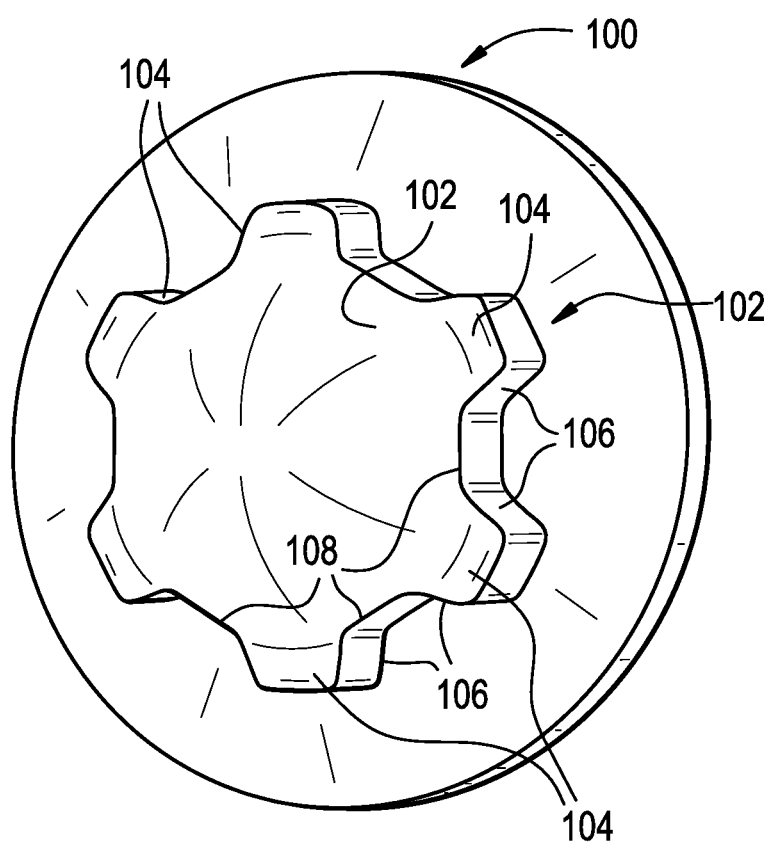

FIGS. 28-31 illustrate a fastener 100 having an external drive profile 102 thereon which is in accordance with an embodiment of the present invention. The external drive profile 102 comprises a plurality of lobes 104, each lobe 104 comprising drive surfaces or drive walls 106 which are formed of polygon involutes. More specifically, preferably each drive surface 106 is formed of polygon involutes comprised of two arcs (or is a single arc construction), and each arc has a constant radius (i.e., is a segment of a circle). The walls 108 between each of the drive surfaces 106 can take many different forms and shapes, as was described hereinabove with regard to the other embodiments. As shown in FIGS. 29 and 30, the external drive profile 102 may have a curved top surface 110. The shaft 112 (only part of which is shown in FIG. 29) preferably has a thread formed thereon (as indicated by lines 114).

Figure 32:
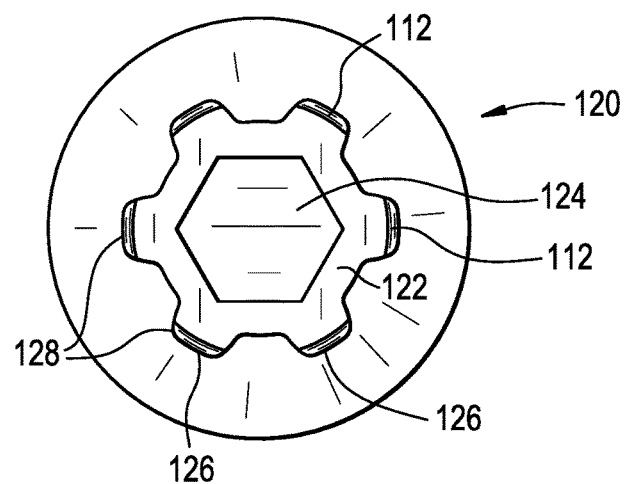
Figure 33:
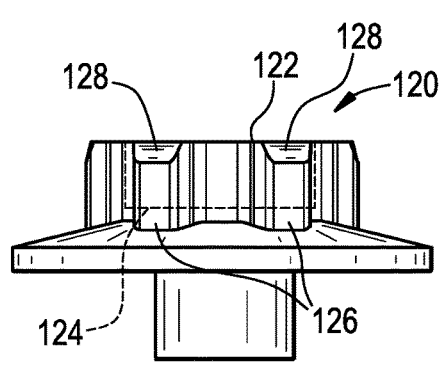
Figure 34:
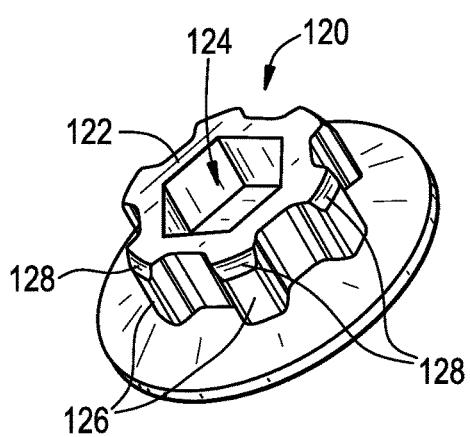
Figure 35:
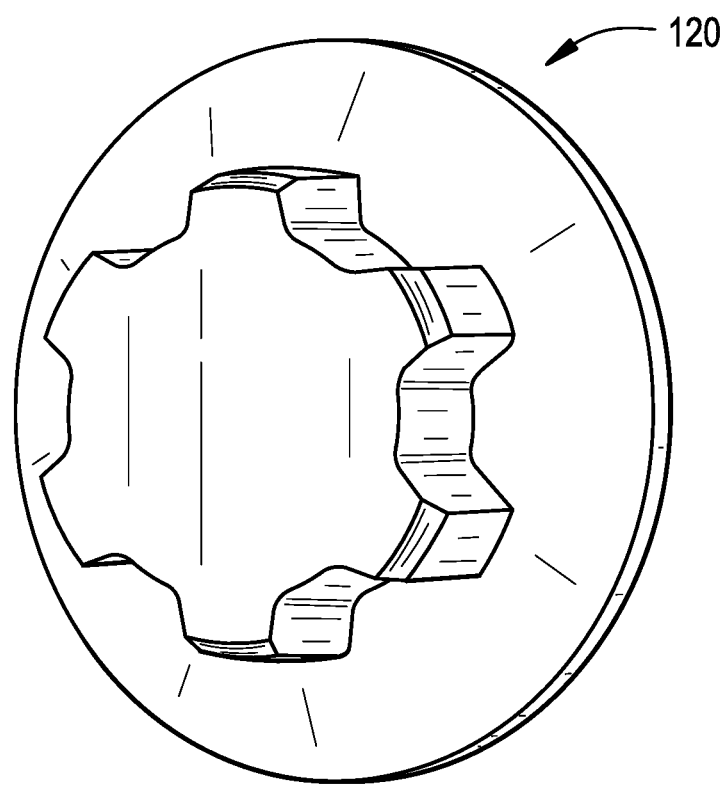

FIGS. 32-34 illustrate a fastener 120 much like that which is shown in FIGS. 28-31, with the only differences being: the top surface 122 is flat (instead of being curved) and has a hexagon-shaped recess 124 formed therein, and each of the lobes 126 has a truncation 128 proximate the top surface 122. These differences not only provide weight savings (i.e., compared to fastener 100 shown in FIGS. 28-31), but also provide an additional internal drive surface via the hexagon-shaped recess 124. FIG. 35 shows the same fastener 120, but shows the fastener 120 either without the hexagon-shaped recess 124 or before the hexagon-shaped recess 124 is formed (such as punched) therein. The recess 124 can take shapes other than a hexagon to provide a drive surface which can be driven with a correspondingly-shaped driver.

Figure 36:
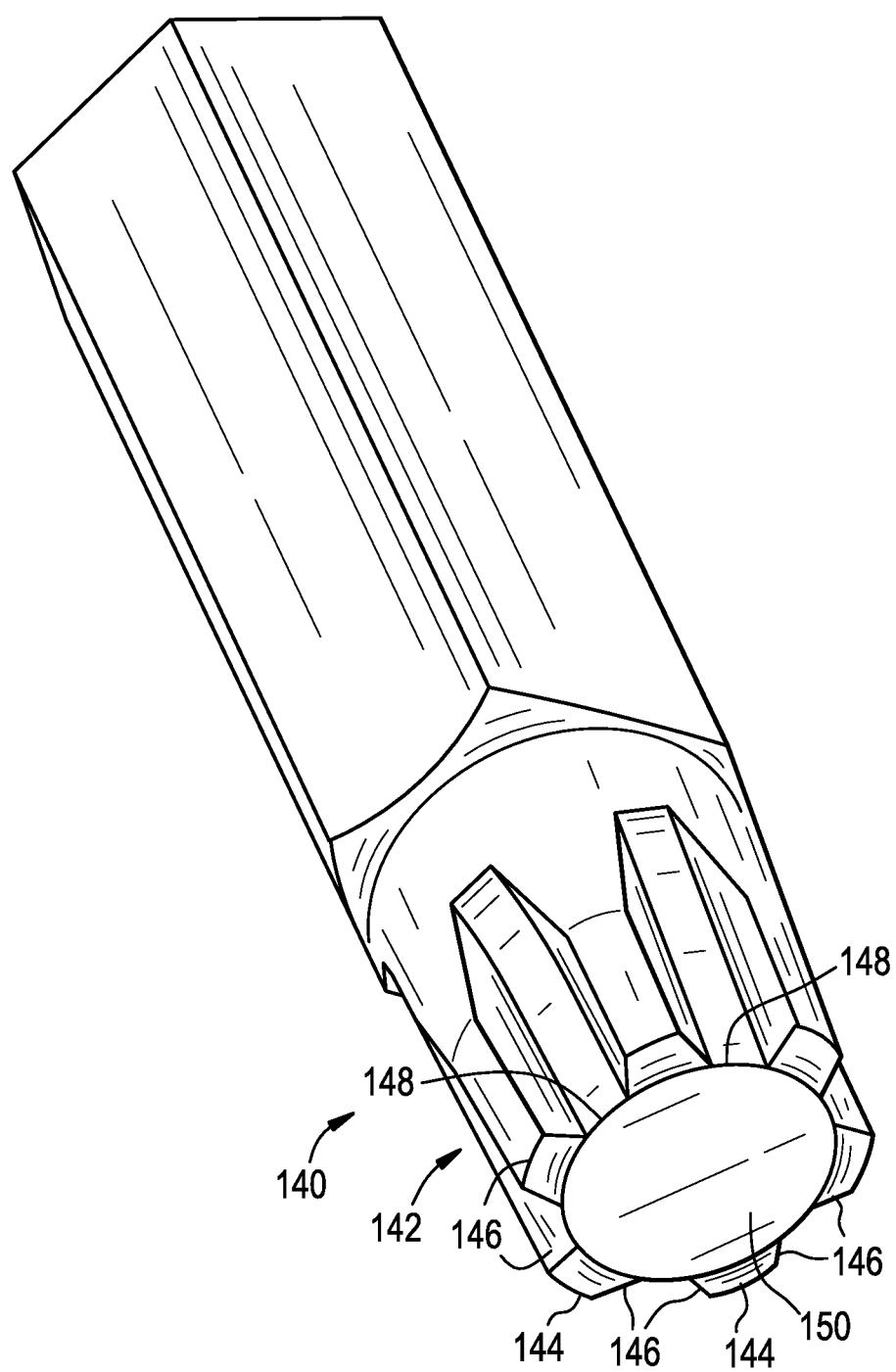

FIG. 36 illustrates a bit (i.e., driver) 140 which has a drive surface profile 142 that comprises lobes 144 configured to provide a stick fit viz-a-viz a standard recess in a fastener. The drive surface profile 142 of the bit has drive surfaces 146 formed of polygon involutes. More specifically, preferably each drive surface is formed of polygon involutes comprised of two arcs (or is a single arc construction), and each arc has a constant radius (i.e., is a segment of a circle). The walls 148 between the drive surfaces 146 can take many different forms and shapes, as was described hereinabove with regard to the other embodiments. As shown, an end surface 150 of the bit 140 can be flat.

Figure 37:
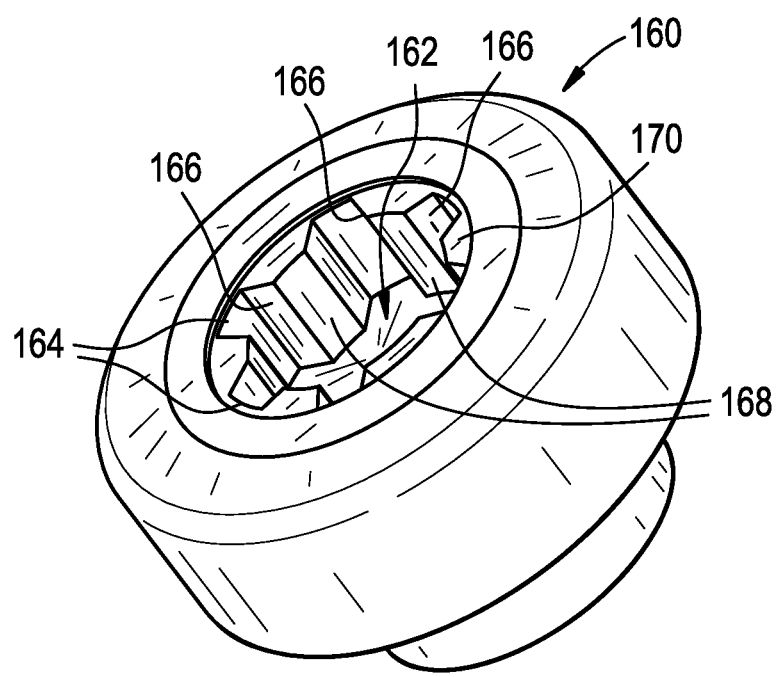

FIG. 37 illustrates a fastener 160 having a recess 162 which in accordance with another embodiment of the present invention. The recess 162 provides lobes 164, wherein each lobe 164 comprises drive surfaces or drive walls 166 which are formed of polygon involutes. More specifically, preferably each drive surface 166 is formed of polygon involutes comprised of two arcs (or is a single arc construction), and each arc has a constant radius (i.e., is a segment of a circle). The walls 168 between each of the drive surfaces 166 can take many different forms and shapes, as was described hereinabove with regard to the other embodiments. Preferably, as the walls 168 go down into the recess, they taper inward (i.e., the distance between a wall 168 and a wall 168 one hundred eighty degrees away in the recess 162 is greater at the top 170 of the recess 162 than it is as the walls 168 progress down into the recess 162).

Figure 38:
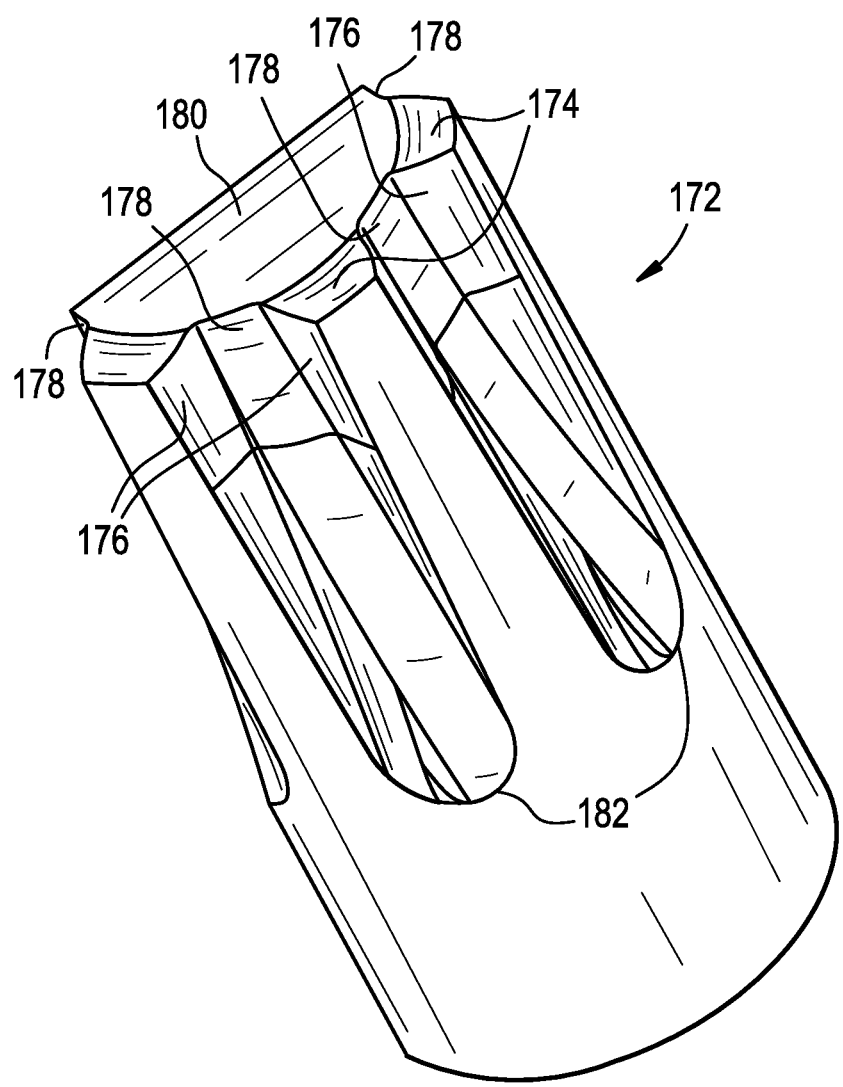

FIG. 38 provides a partial view of a bit 172 which can be used to drive the fastener 160 shown in FIG. 37. As shown in FIG. 38, the bit 172 corresponds in shape to the recess 162 of the fastener 160, and has lobes 174, wherein each lobe 174 comprises drive surfaces or drive walls 176 which are formed of polygon involutes. More specifically, preferably each drive surface 176 is formed of polygon involutes comprised of two arcs (or is a single arc construction), and each arc has a constant radius (i.e., is a segment of a circle). The walls 178 between each of the drive surfaces 176 can take many different forms and shapes, as was described hereinabove with regard to the other embodiments. However, preferably as the walls 178 progress along the bit 172 from the end 180 of the bit 172, the walls 178 taper outwardly (i.e., the distance between a wall 178 and a wall 178 one hundred eighty degrees away is less at the end 180 of the bit 172 than it is as the walls 178 progress down along the bit (i.e., moving toward points 182)).

Figure 39:
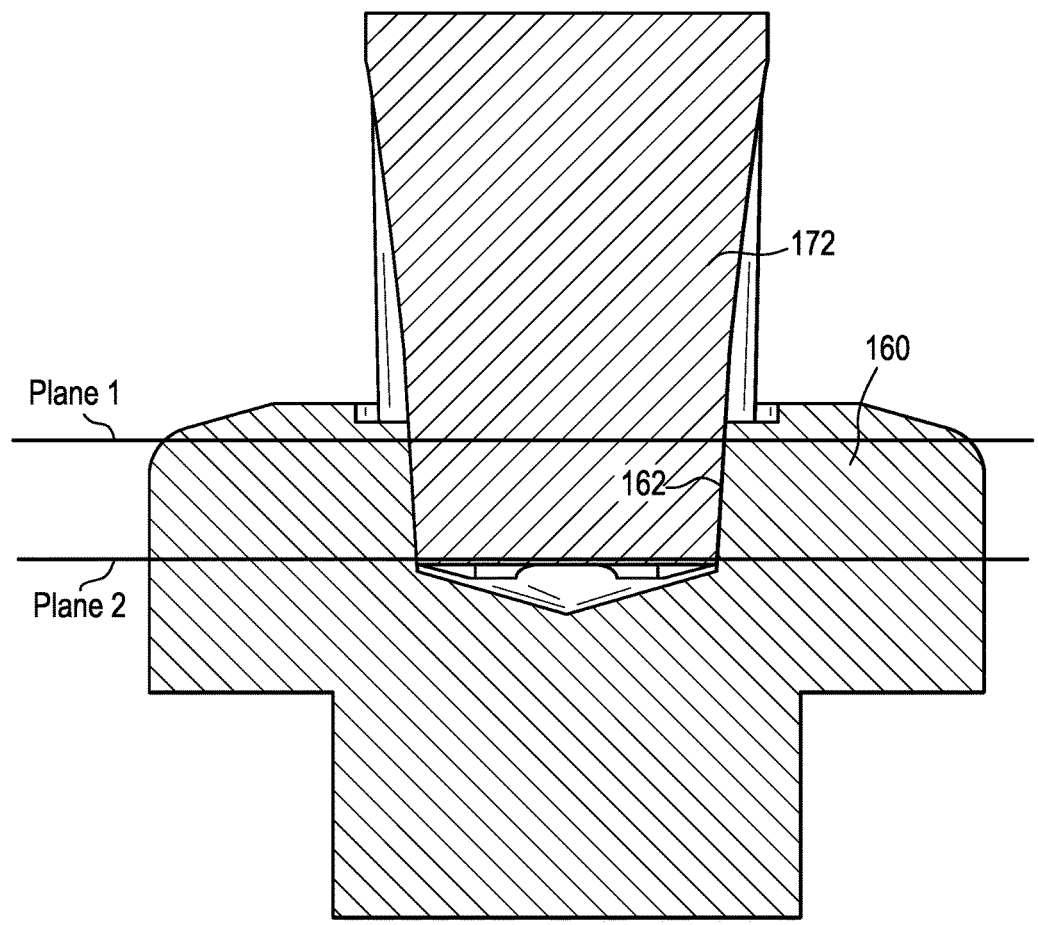

FIG. 39 provides a cross-sectional view showing the bit 172 (see FIG. 38) inserted in the recess 162 of the fastener 160 (see FIG. 37), and is self-explanatory.

Figure 40:
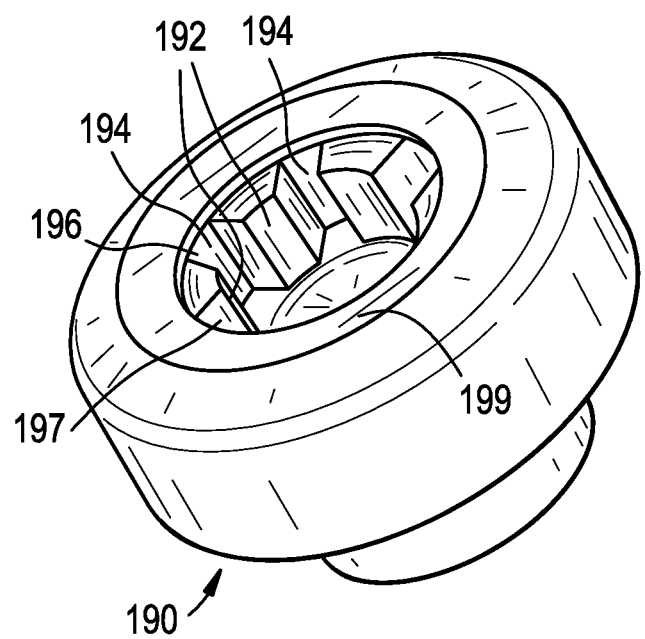
Figure 41:
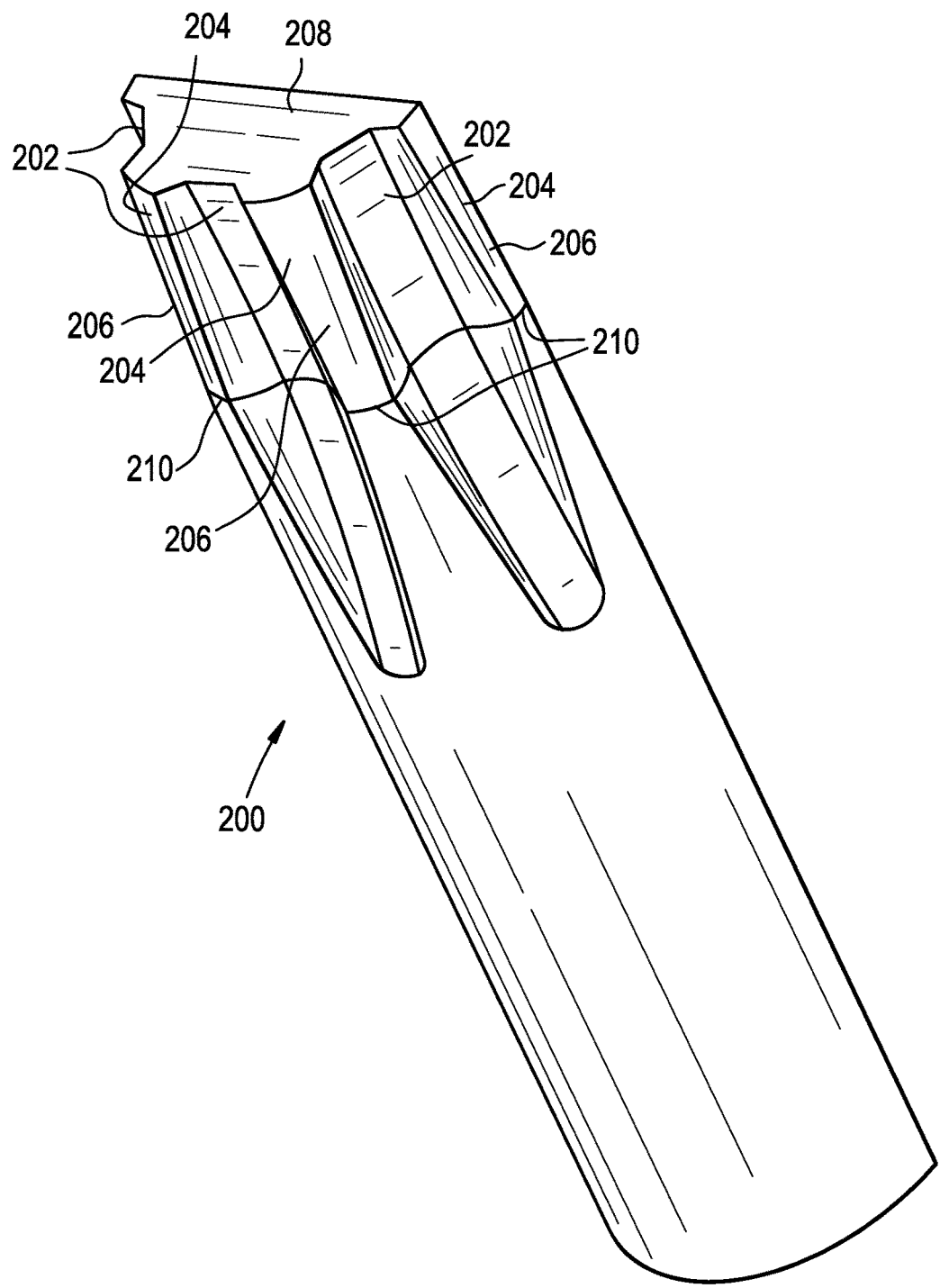

FIGS. 40 and 41 illustrate a fastener 190 and bit 200, respectively, each of which is in accordance with an embodiment of the present invention, and which are much like the fastener 160 and bit 172 shown in FIGS. 37 and 38, except instead of walls 192, 202 being tapered, those walls 192, 202 are straight while walls 194, 204 are tapered. Specifically, the walls 194 of each lobe 196 of the recess 197 in the fastener 190 (see FIG. 40) taper inwardly as the walls 194 progress from the end 199 of the recess 197, down into the recess 197. Correspondingly, the walls 204 of each lobe 206 of the bit 200 (see FIG. 41) taper outwardly as the walls 204 progress from the end 208 of the bit 200, down along the bit (i.e., moving toward lines 210).

Figure 42:
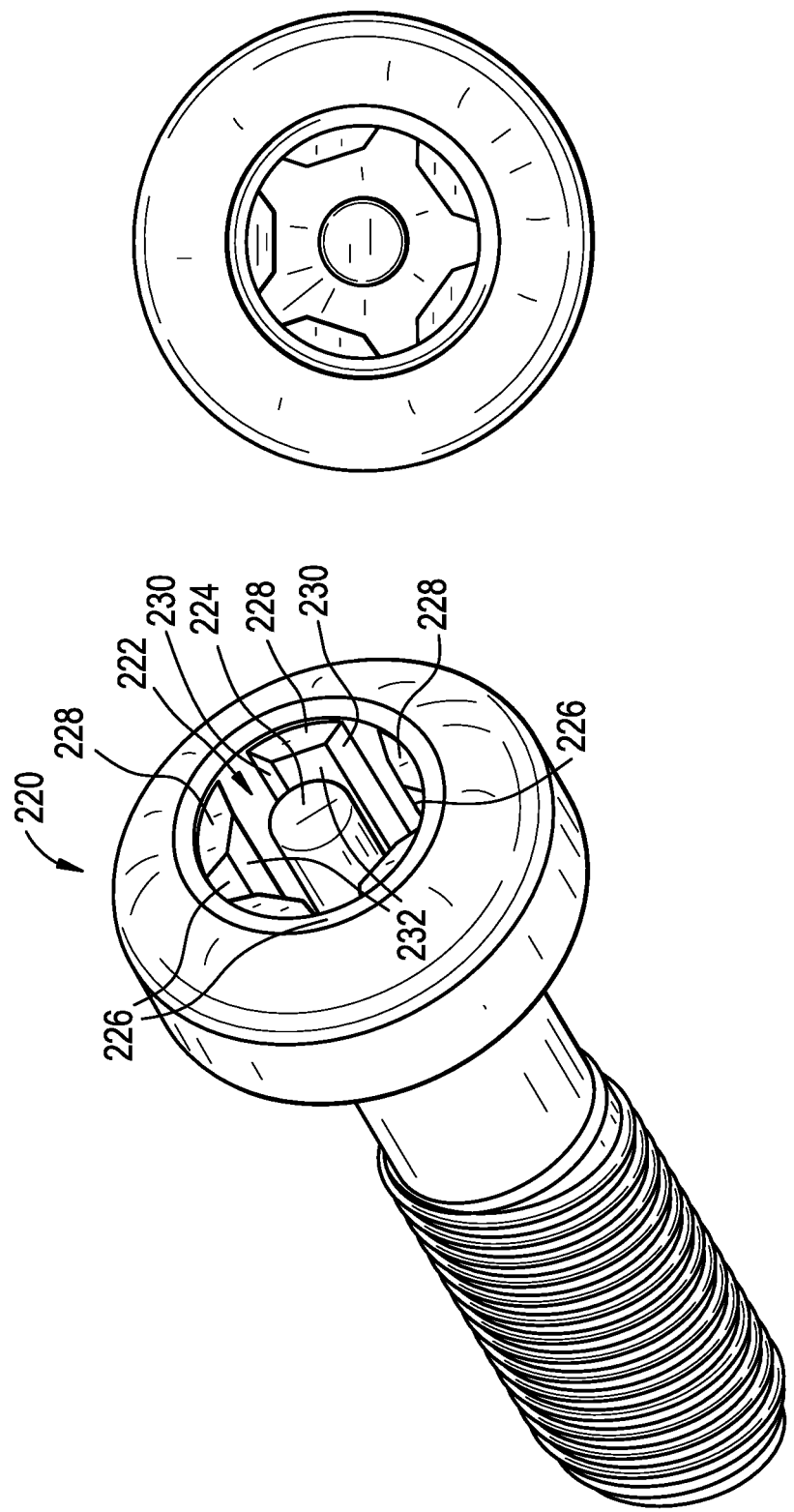

FIG. 42 illustrates a fastener 220 having a recess 222 which has a center post 224, and which effectively provides a 5-lobe drive system with unequal spacing between the lobes 226 and flutes 228. The fastener 220 is in accordance with an embodiment of the present invention. Each lobe 226 has drive surfaces 230 formed of polygon involutes. More specifically, preferably each drive surface 230 is formed of polygon involutes comprised of two arcs (or is a single arc construction), and each arc has a constant radius (i.e., is a segment of a circle). The walls 232 between the drive surfaces 230 can take many different forms and shapes, as was described hereinabove with regard to the other embodiments.

FIGS. 43-50 illustrate various profiles (each of which can correspond to a recess in a fastener, a punch for making the recess in a fastener, or a bit for driving a fastener) showing a various number of lobes, wherein each lobe has drive surfaces that extend to an end of the lobe. Specifically, each shape shown in FIGS. 43, 47 and 48 has six lobes 250, each shape shown in FIGS. 44, 45, 46 and 49 has three lobes 250, and the shape shown FIG. 50 has four lobes 250. Regardless, each lobe 250 has drive surfaces 252 which are formed of polygon involutes. More specifically, preferably each drive surface 252 is formed of polygon involutes comprised of two arcs (or is a single arc construction), and each arc has a constant radius (i.e., is a segment of a circle). The walls 254 between the drive surfaces 252 can take many different forms and shapes, as was described hereinabove with regard to the other embodiments.

Figure 51:
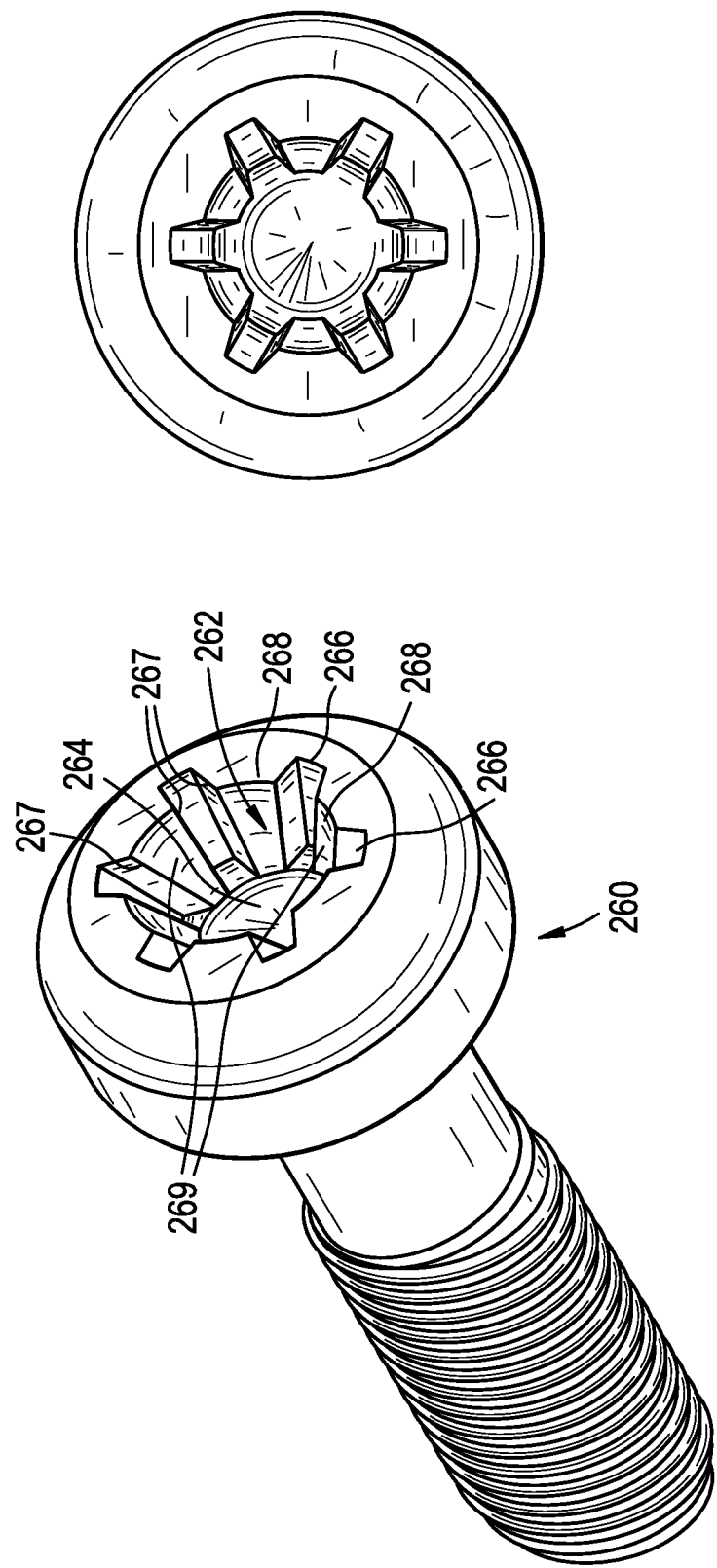
Figure 52:
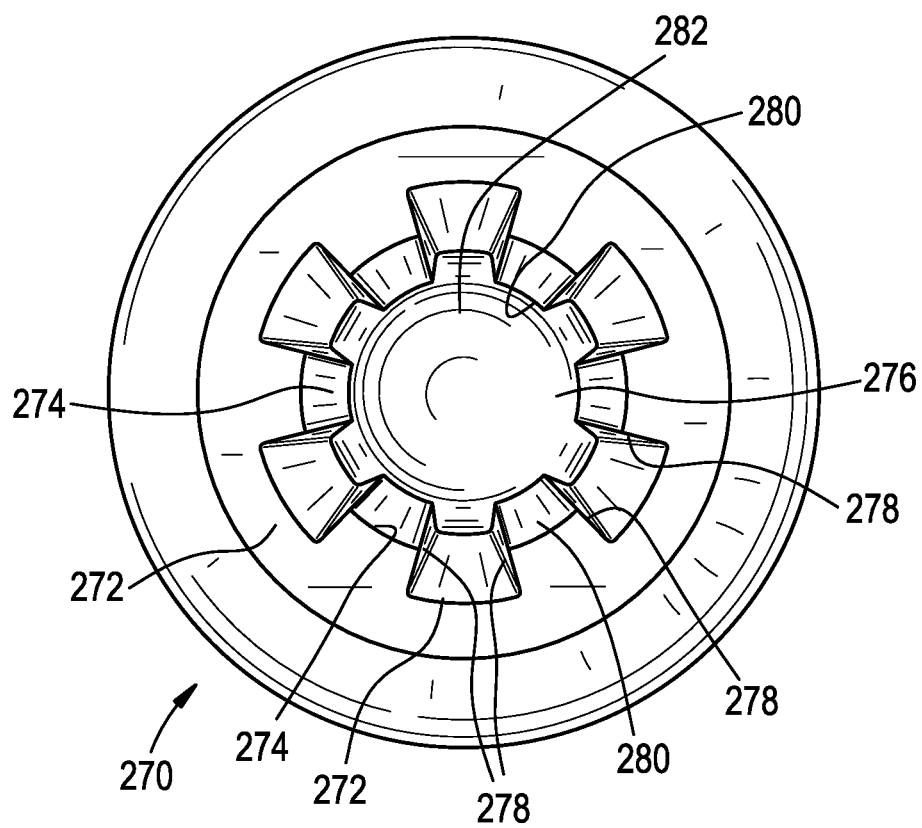

FIG. 51 illustrates a fastener 260 that has a recess 262 with a tapered form, with a round pilot 264 at the bottom of the recess 262. The recess 262 has unequal lobes 266 and flutes 268, meaning that the width of each changes as the lobe 266 or flute 268 progresses down into the recess 262. FIG. 52 illustrates a fastener 270 which is very similar to the fastener 260 shown in FIG. 51, but which has equal lobes 272 and flutes 274, meaning that the width of each does not change as the lobe 272 or flute 274 progresses down into the recess 276. Each fastener 260, 270 is in accordance with an embodiment of the present invention. The lobe 266, 272 of each fastener 260, 270 has drive surfaces 267, 278 formed of polygon involutes. More specifically, preferably each drive surface 267, 278 is formed of polygon involutes comprised of two arcs (or is a single arc construction), and each arc has a constant radius (i.e., is a segment of a circle). The walls 269, 280 between the drive surfaces 267, 278 can take many different forms and shapes, as was described hereinabove with regard to the other embodiments. Either the lobes 266, 272, the flutes 268, 274, or both can be provided as tapering inwardly as the lobe 272 or flute 274 progresses from the top of the recess 276, down into the recess, toward the pilot 282 at the bottom of the recess 276.

Figure 53:
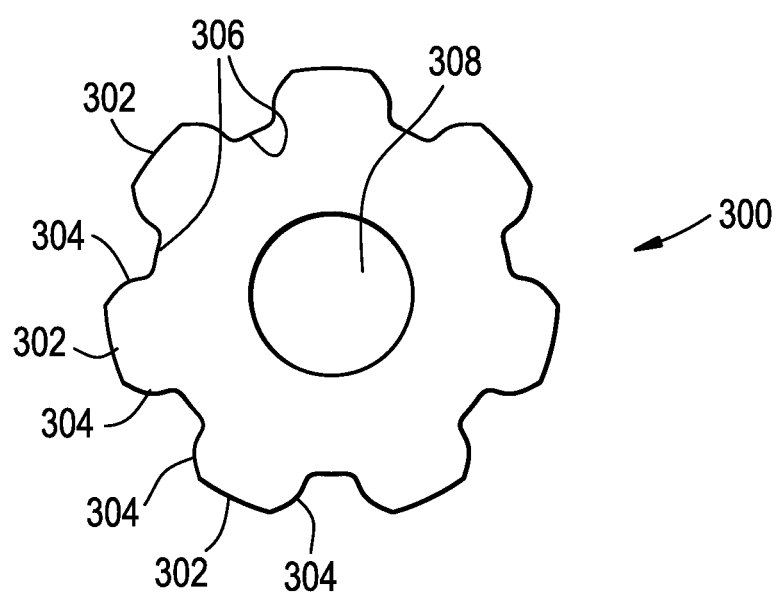

FIG. 53 illustrates a seven-lobed drive profile 300 which can effectively correspond to a recess in a fastener, a punch for making the recess in a fastener, or a bit for driving a fastener. The profile is in accordance with an embodiment of the present invention, and each lobe 302 has drive surfaces 304 formed of polygon involutes. More specifically, preferably each drive surface 304 is formed of polygon involutes comprised of two arcs (or is a single arc construction), and each arc has a constant radius (i.e., is a segment of a circle). The walls 306 between the drive surfaces can take many different forms and shapes, as was described hereinabove with regard to the other embodiments. As shown, the profile can include a center post 308. If provided in the middle of a recess of an installed fastener, the center post would provide that the fastener is tamper-resistant in that only a specific tool can be used to uninstall the fastener. Additionally, the fact that the profile has seven lobes would prevent non-conforming drive tools, such as those having the wrong number of lobes (i.e., 4 lobes, 5 lobes or 6 lobes) from being used on the fastener.

With regard to any of the lobes and flutes mentioned herein, any of them can be provided as being tapered or untapered (i.e., progressing down into the recess, or down along the bit or punch), as well as being equal or unequal (i.e., in terms of whether or not the width is uniform, progressing down into the recess or down along the bit or punch).

While specific embodiments of the invention have been shown and described, it is envisioned that those skilled in the art may devise various modifications without departing from the spirit and scope of the present invention.

What is claimed is:

1. A fastener comprising at least one of an external drive profile and a recess; drive surfaces on at least one of the external drive profile and the recess, each of said drive surfaces extending from an inner to an outer diameter formed of polygon involutes comprising a plurality of continuous tangent arcs, wherein each arc has a radius pointing toward a center of the fastener, wherein the arcs are concave relative to the center of the fastener, wherein each radius is constant but different, and wherein each radius has a center located on locus points of a radius at the center of the fastener.

2. A fastener as recited in claim 1, wherein at least one of the external drive profile and the recess comprises a plurality of lobes, wherein each lobe is formed of polygon involutes.

3. A fastener as recited in claim 2, wherein each lobe is formed of polygon involutes comprised of two arcs.

4. A fastener as recited in claim 3, wherein each arc has a different radius, and each arc has a constant radius where in each is a segment of a circle.

5. A fastener as recited in claim 3, further comprising a wall between each lobe, said wall being flat.

6. A fastener as recited in claim 3, further comprising a wall between each lobe, said wall being at least one of concave circular, convex vertex and concave vertex.

7. A fastener as recited in claim 1, wherein a top surface of said external drive profile is at least of flat and curved.

8. A fastener as recited in claim 7, wherein the top surface of said external drive profile has a recess formed therein.

9. A fastener as recited in claim 7, wherein the top surface of said external drive profile has a hexagon-shaped recess formed therein.

10. A fastener as recited in claim 1, wherein each of the lobes is truncated.

11. A fastener as recited in claim 1, further comprising walls between the lobes, wherein the walls taper at least one of inwardly and outwardly.

12. A fastener as recited in claim 1, further comprising a center post within said recess.

* * * * *